United States Patent [19]
Wilson et al.

[11] Patent Number: 6,019,033
[45] Date of Patent: Feb. 1, 2000

[54] APPARATUS FOR STEAM PASTEURIZATION OF FOOD

[75] Inventors: Robert C. Wilson, Redmond, Wash.; Jerome D. Leising, Shorewood, Minn.; John Strong, Kirkland, Wash.; Jon Hocker, Bothell, Wash.; Jerry O'Connor, Issaquah, Wash.

[73] Assignee: Frigoscandia, Inc., Bellevue, Wash.

[21] Appl. No.: 09/259,036

[22] Filed: Feb. 26, 1999

Related U.S. Application Data

[60] Continuation-in-part of application No. 09/014,358, Jan. 28, 1998, which is a division of application No. 08/553,852, Nov. 6, 1995, Pat. No. 5,711,981, which is a continuation-in-part of application No. 08/335,437, Nov. 7, 1994, abandoned.

[51] Int. Cl.[7] ............................. A23L 1/00; A23L 3/00

[52] U.S. Cl. ................................ 99/470; 99/355; 99/386; 99/443 C; 99/467; 99/477; 99/483; 99/517; 126/20; 126/21 A; 219/388; 219/401; 452/74; 452/77

[58] Field of Search ................ 99/339, 340, 352–355, 99/386, 443 R, 443 C, 448, 467, 468, 470, 473–478, 483, 516, 517, 534; 126/21 A, 20, 369; 219/388, 400, 401; 452/73, 74, 77, 141, 21, 35, 38; 422/21, 22, 26–29, 58, 61, 119, 292, 300, 304; 426/510, 511, 520, 521, 523

[56] References Cited

U.S. PATENT DOCUMENTS

| | | | |
|---|---|---|---|
| 4,255,459 | 3/1981 | Glen | 426/521 |
| 4,805,524 | 2/1989 | Deneuville et al. | 99/470 X |
| 4,921,719 | 5/1990 | Kohlbach | 99/517 X |
| 4,958,477 | 9/1990 | Winkler | 452/35 X |
| 5,008,123 | 4/1991 | Bewley et al. | 99/470 X |
| 5,080,164 | 1/1992 | Hermans | 99/483 X |
| 5,228,396 | 7/1993 | Pfaff | 99/473 X |
| 5,269,216 | 12/1993 | Corominas | 99/470 X |
| 5,522,309 | 6/1996 | Mizobuchi et al. | 99/443 R |
| 5,537,916 | 7/1996 | Lagares-Corominas | 99/470 X |
| 5,551,334 | 9/1996 | Cody | 99/483 X |
| 5,651,730 | 7/1997 | McGinnis et al. | 452/74 |
| 5,685,125 | 11/1997 | Cattelli et al. | 99/470 X |

*Primary Examiner*—Timothy Simone
*Attorney, Agent, or Firm*—Christensen O'Connor Johnson & Kindness PLLC

[57] ABSTRACT

An apparatus for destroying pathogens on food, including a steam chamber having an entrance opening and an exit opening. An entrance door structure nominally closes the entrance opening in the steam chamber and an exit door structure nominally closes the exit opening of the steam chamber. Each of the entrance and exit door structures are composed of a plurality of closely vertically adjacent segments that are mounted to the entrance and exit openings to open and close independently of each other. Flanges extend horizontally from the upper and lower edges of the door segments to maintain a relatively close seal with the adjacent door segment even though the door segments are opened or closed a relatively differing amount.

22 Claims, 20 Drawing Sheets

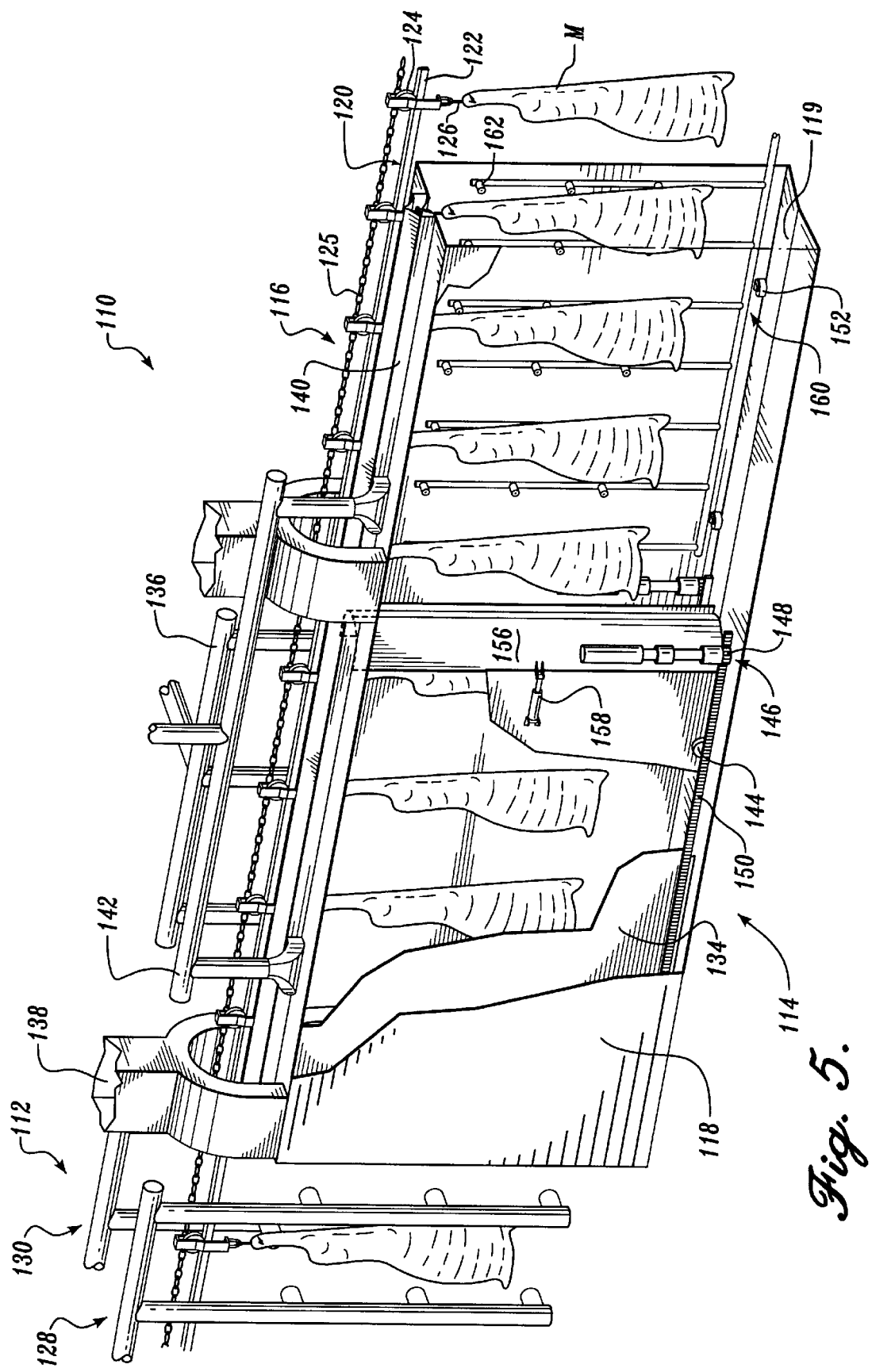

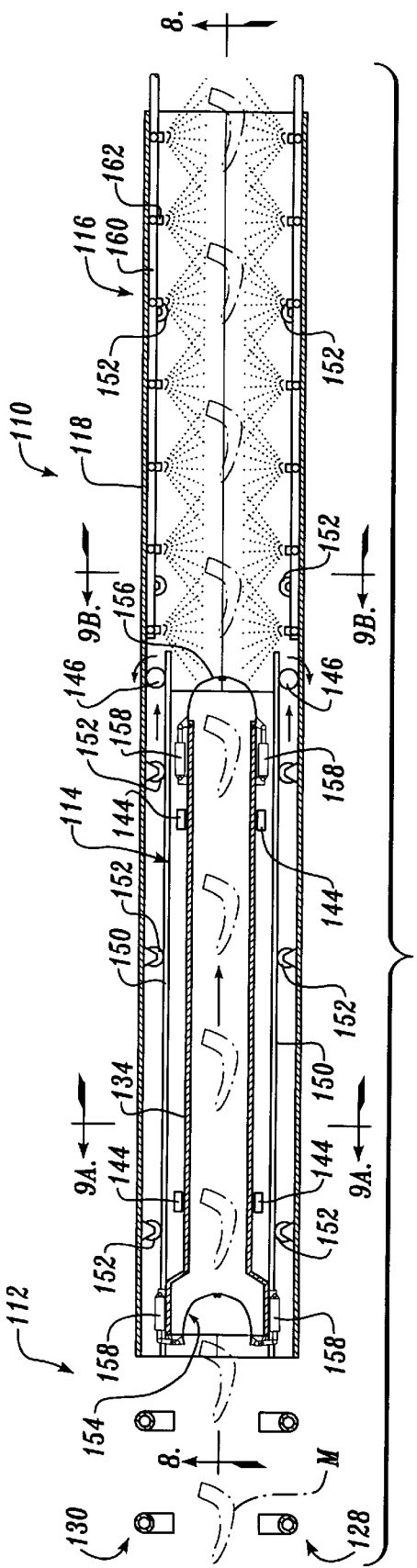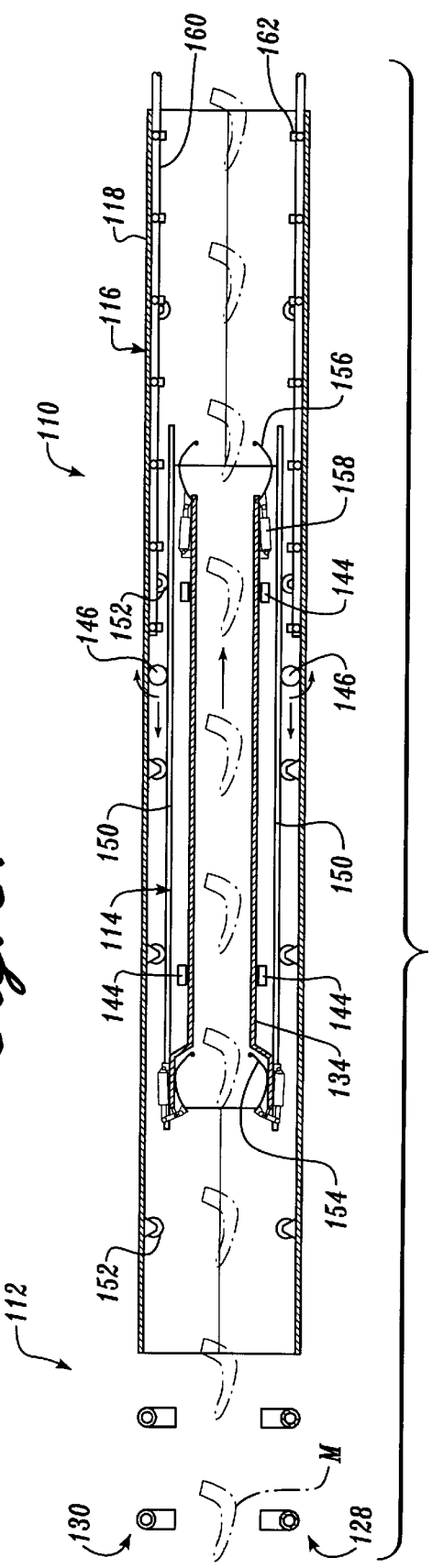

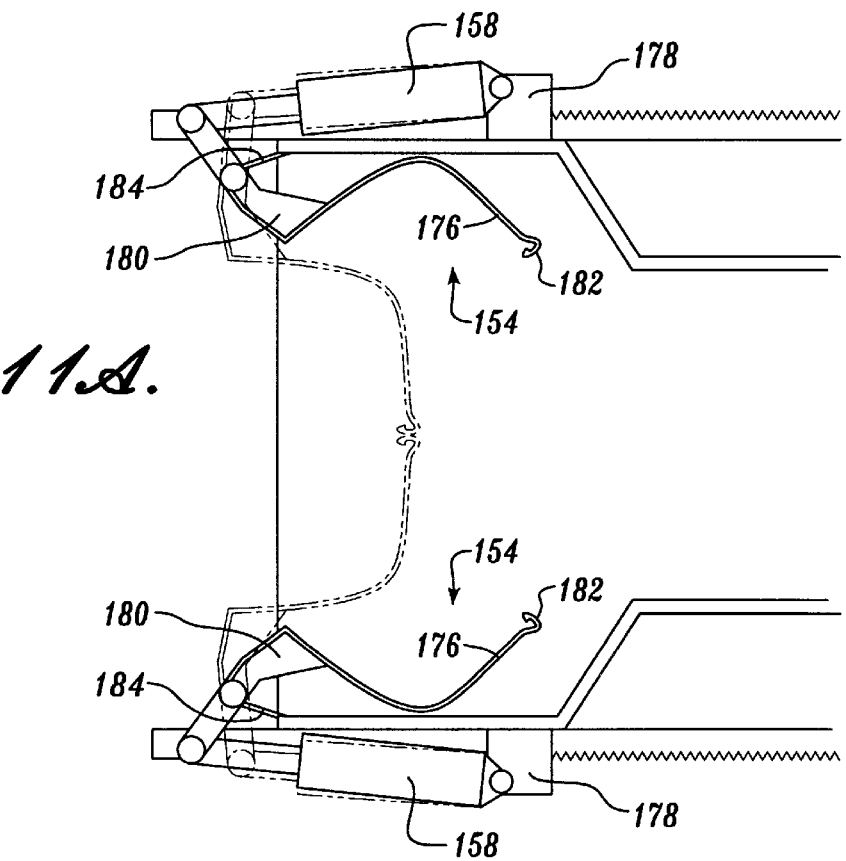
Fig. 11A.
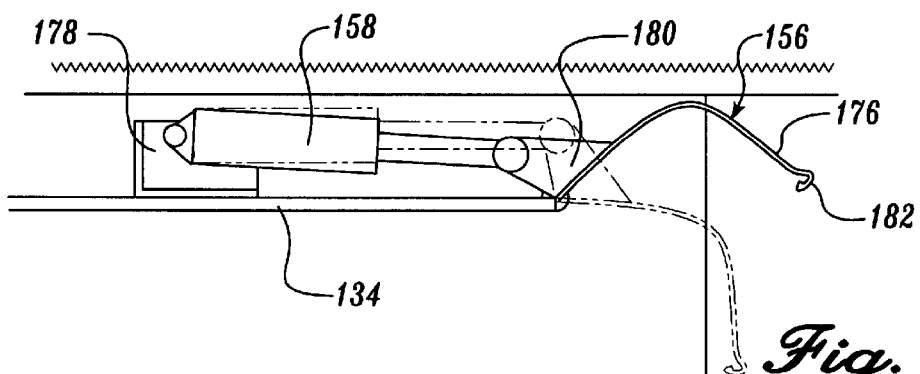
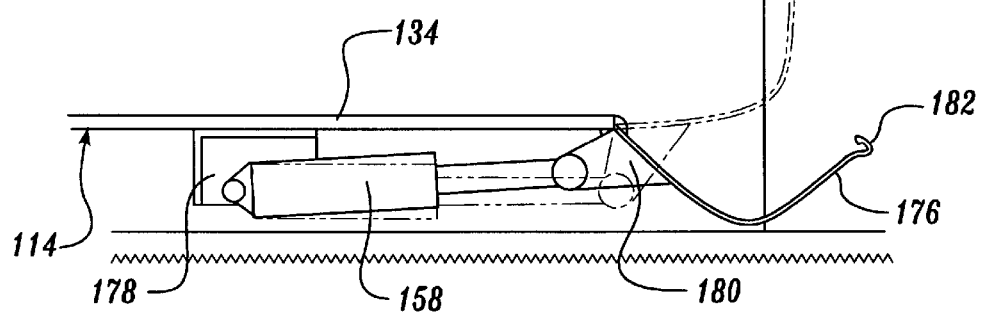
Fig. 11B.

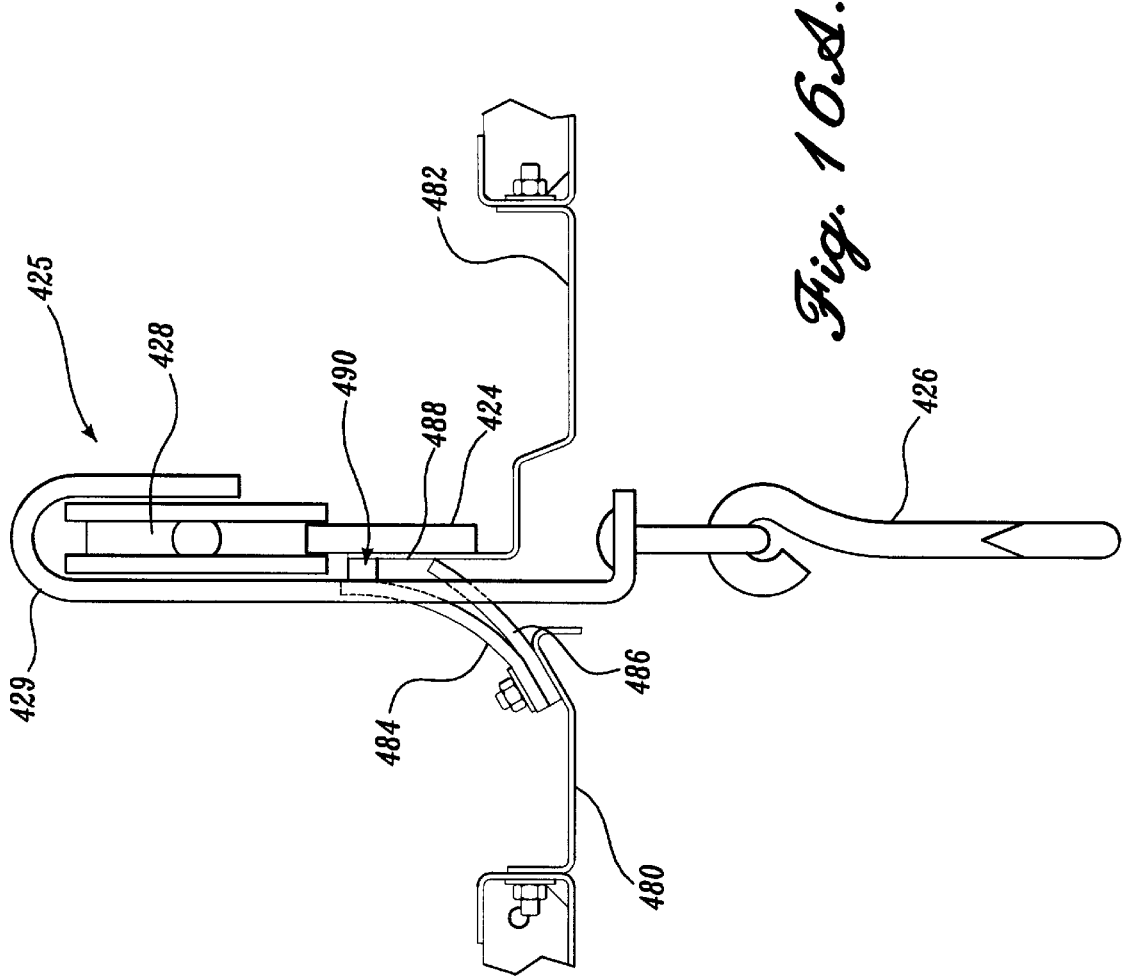

6,019,033

APPARATUS FOR STEAM PASTEURIZATION OF FOOD

RELATED APPLICATIONS

This is a continuation-in-part of prior U.S. patent application Ser. No. 09/014,358, filed Jan. 28, 1998, which is a divisional of prior U.S. application Ser. No. 08/553,852, filed Nov. 6, 1995 and now U.S. Pat. No. 5,711,981, which in turn is a continuation-in-part of U.S. patent application Ser. No. 08/335,437, filed Nov. 7, 1994, now abandoned the benefit of the filing dates of which is claimed herein.

FIELD OF THE INVENTION

This invention relates generally to apparatuses and processes for cleaning foods, and more particularly, to a processor and method for destroying coliform bacteria and other surface pathogens on meat and other types of foods.

BACKGROUND OF THE INVENTION

Concerns over pathogens on meat have been elevated in recent years due to *E. coli* related illnesses and deaths. In response, certain regulations have been imposed on food preparers and recommendations have been made to increase the likelihood that pathogens are killed. For example, restaurants must cook hamburger at 160° F. throughout for at least five seconds.

Such end user regulations have been made in an attempt to correct a problem that begins during meat processing. *E. coli*, other coliform bacteria, and many other pathogens reside on the surface of meat beginning with the meat carcass processing. The pathogens originate from fecal matter and other contaminants on the surface of the meat. Without adequately destroying these pathogens, the meat is processed, packed, and shipped to the distributor, retailer, or consumer. It is then left to the consumer or preparer of the meat to address a problem that by then can be even worse. The bacteria may have further grown or may reside throughout the meat. This is the case, for example, with ground meat since during meat processing the surface pathogens are distributed throughout the meat.

The only precaution currently taken by the meat processors is to spray the carcasses with water at 120–140° F. This measure is not necessarily effective or efficient at destroying the surface pathogens. Not all pathogens are killed at these temperatures and large volumes of water are required, along with a large amount of energy to heat the water, since the water cannot easily be recirculated if contaminants are to be avoided.

The process and apparatus of the present invention were developed to effectively and efficiently stop pathogen-infested meat and poultry products from reaching the end user.

SUMMARY OF THE INVENTION

The difficulties and drawbacks of the prior art methods and apparatuses for destroying coliform and other pathogenic bacteria on the surface of meat such as beef, poultry, pork and other meat products are overcome by the apparatuses and methods of the present invention. The apparatuses and methods of the present invention destroy pathogenic bacteria and other harmful contaminants on all the surface areas of the meat without introducing chemicals or other harmful and expensive products into the process. The methods and apparatuses are also carried out effectively and inexpensively.

An apparatus for destroying pathogens on meat is disclosed. The apparatus includes a dewatering chamber, a steam heating chamber, a chilled water chamber, and a meat conveyor. The dewatering chamber includes an air blower with nozzles for blowing air at the surface of the meat to remove surface water from the meat. The steam chamber is disposed adjacent the dewatering chamber. The steam chamber includes a steam chamber enclosure that is sealed for maintaining a positive pressure in the steam chamber relative to the dewatering chamber. The steam chamber also includes a steam supply line for filling and maintaining the steam chamber with steam. The chilled water chamber is disposed adjacent the steam chamber opposite from the dewatering chamber. The chilled water chamber has nozzles for spraying chilled water onto the surface of the meat for rapidly cooling the meat, after it is passed through the steam chamber. The meat conveyor extends through the dewatering chamber, the steam chamber, and the chilled water chamber. The meat conveyor supports the meat and transfers it from chamber to chamber. A method for destroying pathogens on meat is also disclosed that includes the steps of removing surface water from the meat, passing the meat through a steam heating chamber having a positive pressure relative to the outside of the steam chamber, to quickly heat the exterior of the meat then rapidly chill the surface of the meat.

The steam chamber further includes a floor that is sloped to collect the condensate that drips from the meat. At the lowest point in the floor a pressure retaining drain allows the water to be channeled away from the steam chamber without release of pressure therefrom. The steam chamber enclosure also includes pressure retaining entrance and exit doors to maintain the positive pressure in the steam chamber as meat enters and exits the steam chamber. The steam chamber also includes a steam distribution system extending along the length of the steam chamber enclosure and including outlets to dispense steam into the steam chamber.

The air nozzles in the dewatering chamber are preferably arranged in banks on either side of the conveyor that transfers the meat, such that the meat is advanced between the two banks of air blower nozzles. An enclosure around these air nozzle banks is also preferably provided.

The chilled water chamber also includes, preferably, water spray banks on either side of the conveyor for spraying chilled water over the entire surface of the meat. An enclosure also surrounds the chilled water sprayers to form a chilled water chamber.

As an alternative, rather than utilizing a separate dewatering chamber, the dewatering can take place at a station exterior to the steam chamber. High volume air blowers or other apparatus can be provided for blowing air at the surface of the meat.

Also, various types of entrance doors can be used in conjunction with the present invention. The entrance doors may be of the revolving type, somewhat similar to that used in entrances to hotels, office buildings, etc., when desiring to seal the interior of the building from the exterior. The doors may also be of a swinging nature, either a single door or two doors of a "saloon" configuration. The swinging doors may each be composed of a single full height panel or composed of segments arranged along the height of the door, whereby each segment is rotatable independently of the other segments. The door may be opened and closed by a power device, or may be simply spring-loaded to be opened when pushed against In a further more specific aspect of the present invention, the steam for destroying pathogens is ideally introduced at the bottom of the steam chamber. However, the steam can also be introduced into the steam chamber at other locations, including at the top of the steam chamber.

An alternate preferred method for destroying pathogens on meat that is attached to a conveyor is also disclosed. The method includes moving at least one first unit of the meat (e.g. a beef carcass) into a movable steam chamber, moving the steam chamber with the first unit enclosed therein along the conveyor, subjecting the first unit to steam within the steam chamber, removing the steam chamber from the first unit, and rapidly chilling the surface of the first unit of the meat. Subjecting the first unit to steam heats the surface of the first unit of meat to destroy the pathogens.

In a preferred embodiment, the steam chamber moves at substantially the same rate as the conveyor during the step of moving the steam chamber. In this manner, the steam chamber does not have to be stopped while steam surrounds the first unit of meat. The step of removing the steam chamber from the first unit of meat is preferably carried out by moving the steam chamber in a direction opposite the direction of travel of the conveyor along the path of the conveyor. Preferably, the steam chamber includes an entrance door at the upstream end of the steam chamber and an exit door at the downstream end. The method further includes closing the entrance door after the first unit moves into the steam chamber and opening the entrance and exit doors before removing the steam chamber from the first unit.

A second unit of meat may next be enclosed within the steam chamber upon removing the steam chamber from the first unit. The steam chamber is rapidly evacuated of steam before the step of removing the steam chamber from the first unit.

The step of rapid chilling is carried out by directing a coolant fluid at the surface of the first unit of meat. The temperature of the coolant fluid is lower than that of the surface of the meat. The coolant fluid preferably includes water and may contain an antimicrobial agent in the water. Alternatively, the coolant fluid may include ambient air or another gas that may be cooled relative to the ambient air.

The method of the present invention preferably includes a step of dewatering the first unit of meat before moving the meat into the steam chamber. Furthermore, the steam surrounding the meat within the steam chamber may alternatively be superheated or subcooled.

The process may be monitored by recording heat-treating conditions of the first unit of meat by ascertaining the initial surface temperature, the surface temperature as the meat is subject to the steam, and the surface temperature after being chilled. The length of heat treatment may also be ascertained and recorded. Rather than measuring the surface temperature of each unit of meat within the steam chamber, this information may be determined by measuring the temperature within the steam chamber as the meat is being transferred into the steam chamber, during the steam treatment process and also during the cooling process. Standard temperature gauges may be utilized for monitoring the temperature within the steam chamber.

Another preferred apparatus for pasteurizing meat held by a conveyor, as the meat is carried along by the conveyor, is also provided. This preferred apparatus includes a stationary fame, a steam chamber and a cooling system. The stationary frame extends along a portion of the conveyor. The steam chamber is movably coupled to the stationary frame and is sized to enclose at least one piece of meat being held by the conveyor. The steam chamber includes a drive system to move the chamber along a portion of the conveyor to heat the surface of the meat as the meat moves with the conveyor. The steam chamber includes an upstream end and a downstream end. The steam chamber drive system is operable to retract the steam chamber along the stationary frame in a direction opposite to the direction of movement of the conveyor. The cooling system is associated with the stationary frame and is for rapidly cooling the surface of the meat that has been heated by the steam.

The apparatus may also include a stationary enclosure associated with the stationary frame. The stationary enclosure surrounds the steam chamber and may also surround the cooling system. A vacuum system is secured to the stationary enclosure and is operatively engaged with the steam chamber to evacuate steam therefrom.

The steam chamber includes an entrance door attached thereto at the upstream end of the steam chamber. An exit door is also provided attached to the steam chamber at the downstream end. The exit door preferably includes curved panels with concave sides facing the interior of the steam chamber. The panels include actuators for opening and closing the steam chamber.

The cooling system preferably includes fluid jets attached to the stationary frame. The fluid jets may be water jets, air jets or other types of jets.

An alternate preferred embodiment of the invention includes a system for removing surface liquid, a steam supply and a system for cooling the surface of meat, all carried within a chamber. The chamber receives, and at least partially encloses, the meat. The system for removing surface liquid from the meat may be both secured to the inside of the side walls of the chamber, as well as the system for cooling the surface of the meat. The steam supply is coupled to the chamber to apply steam to the surface of the meat. The meat preferably hangs from and moves along a conveyor. The apparatus also includes a stationary frame located below the conveyor, with the chamber being powered to move relative to the frame. Thus, the chamber moves along the path of the conveyor with the meat such that the meat can be processed as the meat moves. The system for removing surface liquid preferably includes fluid lines attached to and extending within the chamber. The fluid is blown at the surface of the meat within the chamber to remove excess surface liquid from the meat prior to steam treatment. The cooling system preferably includes a coolant fluid supply and coolant lines attached to and extending within the chamber. The coolant may be applied to the surface of the meat within the chamber after steam treatment of the meat.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is an isometric view of another preferred embodiment of the present invention showing meat being moved through a processor;

FIG. 6 is a top view of the processor of FIG. 5 showing a steam chamber in a retracted position;

FIG. 7 is a top view of the processor of FIG. 5 showing the steam chamber being retracted as the meat continues to move in a downstream direction;

FIG. 11A is an enlarged, fragmentary top view showing the entrance door;

FIG. 11B is an enlarged, fragmentary top view showing the exit door, and

FIG. 16A is an enlarged fragmentary view of a portion of FIG. 16;

DETAILED DESCRIPTION OF THE PREFERRED EMBODIMENT

Figure 1:
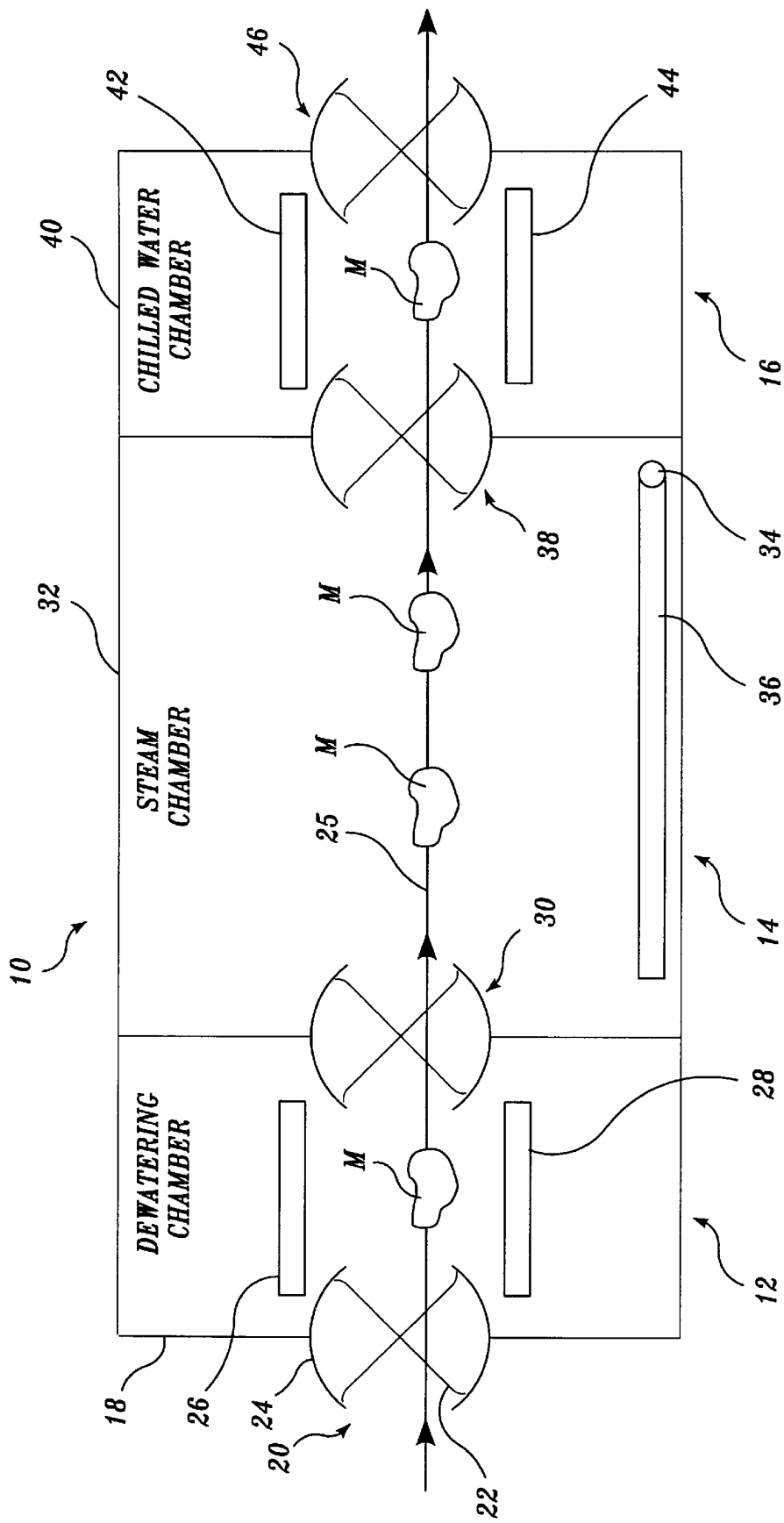
FIG. 1 is a schematic plan view of the process and apparatus of the present invention illustrating the movement of a side of beef along an overhead conveyor through the various chambers of the present invention.

A schematic diagram of one preferred embodiment of the present invention is shown in FIG. 1. A processor 10 is provided to rid the surface of unskinned or skinned meat M of any pathogens, such as *E. coli* 0157:H7 and other coliform-type bacteria, listeria, and salmonella. Processor 10 includes three chambers: a dewatering chamber 12, a steam heating chamber 14, and a chilled water cooling chamber 16. Meat M passes through each of these chambers in series. After passing through chilled water chamber 16 meat M has been cleansed from surface bacteria and is ready to be further processed by cutting, packaging, freezing, or otherwise. Note that while the preferred embodiment refers to beef, other meat can be processed with the apparatus and method of the present invention, such as pork or poultry. Also, while in the preferred embodiment the meat passes through different chambers to be processed, the meat could remain stationary while the process steps are carried out with corresponding equipment.

The first section of processor 10 entered by meat M is dewatering chamber 12. Dewatering chamber 12 includes a dewatering chamber enclosure 18 to seal off dewatering chamber 12 from external moisture or pollution. A processor entrance door 20 is provided at one side of dewatering chamber enclosure 18 to allow meat M to pass into dewatering chamber 12. Processor entrance door 20, as well as the other doors referenced below, is constructed in a pinwheel fashion with a plurality of door arms 22 extending outwardly from a central vertical axis about which the arms 22 rotate. A shield 24 is formed in circular arc sections to engage the outer ends of door arms 22. Shield 24 includes arcuate portions on both sides of door arms 22 such that a positive closure of dewatering chamber 12 is always achieved as door arms 22 rotate. At least two of door arms 22 will always be in contact with shields 24 to enclose the entrance to the dewatering chamber 12.

Alternatively, dewatering chamber 12 may be omitted from processor 10. The meat M would then simply enter steam chamber 14 directly.

Meat M rides through processor entrance door 20 hanging from a conveyor 25. Conveyor 25 is preferably constructed in a known fashion as a standard meat conveyor with an overhead chain to move the product along a processing stream. However, other conveyor systems may also be used.

After meat M passes through processor entrance door 20 it travels along conveyor 25 between left and right air banks 26 and 28. Air banks 26 and 28 remove surface moisture from meat M prior to meat M entering into steam chamber 14. Further details of air banks 26 and 28 are discussed below in connection with FIG. 2.

Conveyor 25 then carries meat M to the exit side of dewatering chamber 12 and into the steam heating chamber entrance door 30. Steam chamber entrance door 30 closes the air path between dewatering chamber 12 and steam chamber 14 such that a positive seal is created between the two chambers. Steam chamber entrance door 30 is preferably similar in construction to processor entrance door 20. However, besides prohibiting contamination from entering steam chamber 14, stream chamber entrance door 30 also provides an air seal so that a positive pressure may be created in steam chamber 14 relative to dewatering chamber 12.

Steam chamber 14 includes a steam chamber enclosure 32 which functions to hold steam and a positive pressure therewithin. Conveyor 25 runs through steam chamber 14 from steam chamber entrance door 30 to a steam chamber exit door 38. Within stream chamber 14 a steam delivery pipe 34 delivers steam to a steam distribution pipe 36 which extends along the steam chamber 14. Further details of steam chamber 14 will be discussed below in connection with FIG. 3.

Meat M then passes through steam chamber exit door 38 into cooling chamber 16. Steam chamber exit door 38 is similar in detail to steam chamber entrance door 30. Cooling chamber 16 includes an enclosure 40 that keeps the spray of chilled water within chamber 16 and keeps contaminants away from meat M. Cooling chamber 16 includes left and right chilled water spray banks 42 and 44, respectively. A processor exit door 46 is provided at the output side of chilled water chamber 16. Preferably, processor exit door 46 is similar in construction to processor entrance door 20. Conveyor 25 then carries meat M from processor 10.

Figure 2:
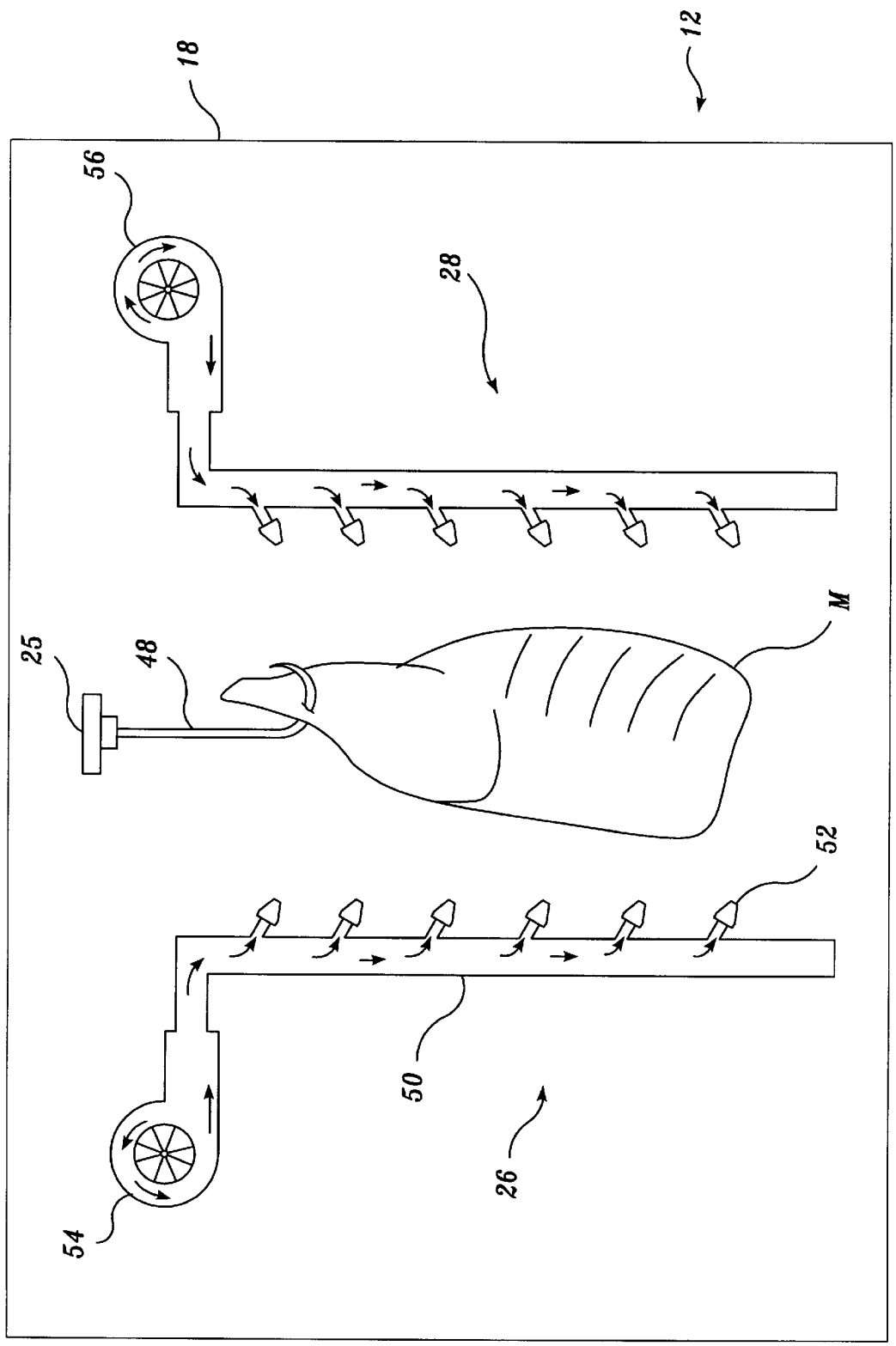
FIG. 2 is a semi-schematic elevational view of the dewatering chamber of the present invention.

As seen in FIG. 2, conveyor 25 also includes a hook 48. Hook 48 is used to secure meat M such that meat M hangs therefrom as it travels through chambers 12, 14, and 16.

The details of dewatering chamber 12 will be discussed. Dewatering chamber 12 includes air manifold pipes 50 with nozzles 52. Manifold pipes 50 and nozzles 52 form left and right air banks 26 and 28. Nozzles 52 shoot air at high velocity at meat M to substantially remove surface water that may reside on the surface or in the crevices of meat M. The high pressure air is provided by left and right blowers 54 and 56. The air travels from the blowers through air pipe 50 and out nozzles 52 against meat M. Air banks are positioned on both sides of meat M so that standing areas or droplets of surface water are substantially removed from the entire surface of meat M before entering steam chamber 14. Removal of substantially all significant amounts of standing surface water is preferred so that, once within steam chamber 14, a significant amount of heat is not absorbed by surface water but instead is transferred directly to the surface of the meat to destroy pathogens. The surface of the meat may still be moist to the touch, but dewatering removes most standing water, whether it be areas of water on the meat surface, or just droplets of water.

Figure 3:
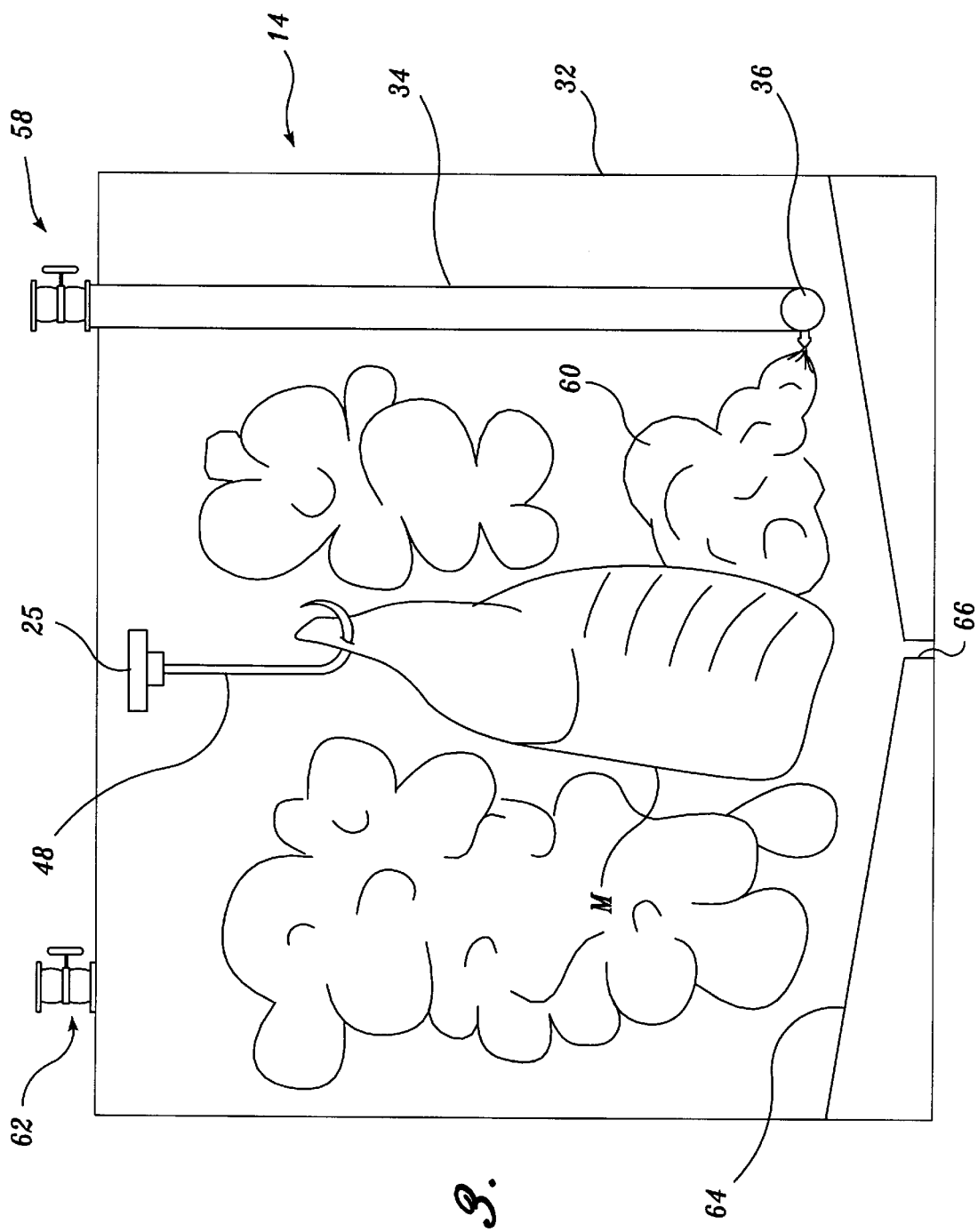
FIG. 3 is a semi-schematic elevational view of the steam chamber.

Referring now to the semi-schematic elevational view of steam heating chamber 14 illustrated in FIG. 3. An entrance valve 58 is provided at the top of steam chamber and closure 32 to deliver steam 60 through delivery pipe 34 and distribution pipe 36. Steam 60 is continually pumped into heating chamber 14 through pipe 36 such that a positive pressure is created within heating chamber 14. The preferred pressure differential is about two inches of water. Other positive pressures could be used, preferably falling anywhere from about one-half to five inches of water relative to dewatering chamber 12 and the cooling chamber 16 as well as the outside environment. However, as little as 0.01 inches of water pressure may be used. A positive pressure within steam chamber 14 helps to ensure that steam 60 very rapidly comes into contact with all surface areas of meat M and air is excluded from steam chamber 14.

As steam 60 contacts and surrounds meat M after it passes through steam chamber entrance door 30, steam 60 heats the surface of meat M. Steam 60 within heating chamber 14 is preferably at 212° F. at saturation. The steam 60 may be superheated to a temperature above 212° F. A pressure relief valve 62 is in communication with the heating chamber enclosure 32 to maintain the desired positive pressure within heating chamber 14.

As steam 60 envelops and contacts the surface of meat M, heat is drawn into the surface of meat M through steam contact. Steam condenses on the surface of meat M. The condensation of steam 60 onto the surface of meat M produces a transfer of heat energy, specifically the change-of-state energy from steam 60, to the surface of meat M. This transfer of energy heats the surface of meat M very quickly and effectively to kill any pathogens residing thereon.

As the condensation continues, water drips to the bottom of steam chamber 14. Steam chamber 14 is provided with a sloped floor 64 and a drain 66 at the bottom thereof to collect this water. Drain 66 is constructed such that pressure does not escape therefrom.

Meat M is preferably kept within steam chamber 14 for approximately 2½ to 30 seconds, 10 seconds being optimal. The surface of meat M is heated one to five microns deep at approximately 160° F.–198° F. during this time. Meat M may also stay within steam chamber 14 a longer amount of time. However, between 2½ to 30 seconds is a preferred amount of time to maintain the surface of meat M between 160 and 198° F. to sufficiently reduce coliform bacteria, salmonella, and other pathogens. The preferred temperature range at the surface of meat M is between 160° F. to 198° F. The time within steam chamber 14 may be set by the speed of conveyor 25 combined with the length of steam chamber 14. The temperature of the meat surface may be extrapolated from temperature measurements taken at various locations, preferably about four, within steam chamber 14.

Figure 4:
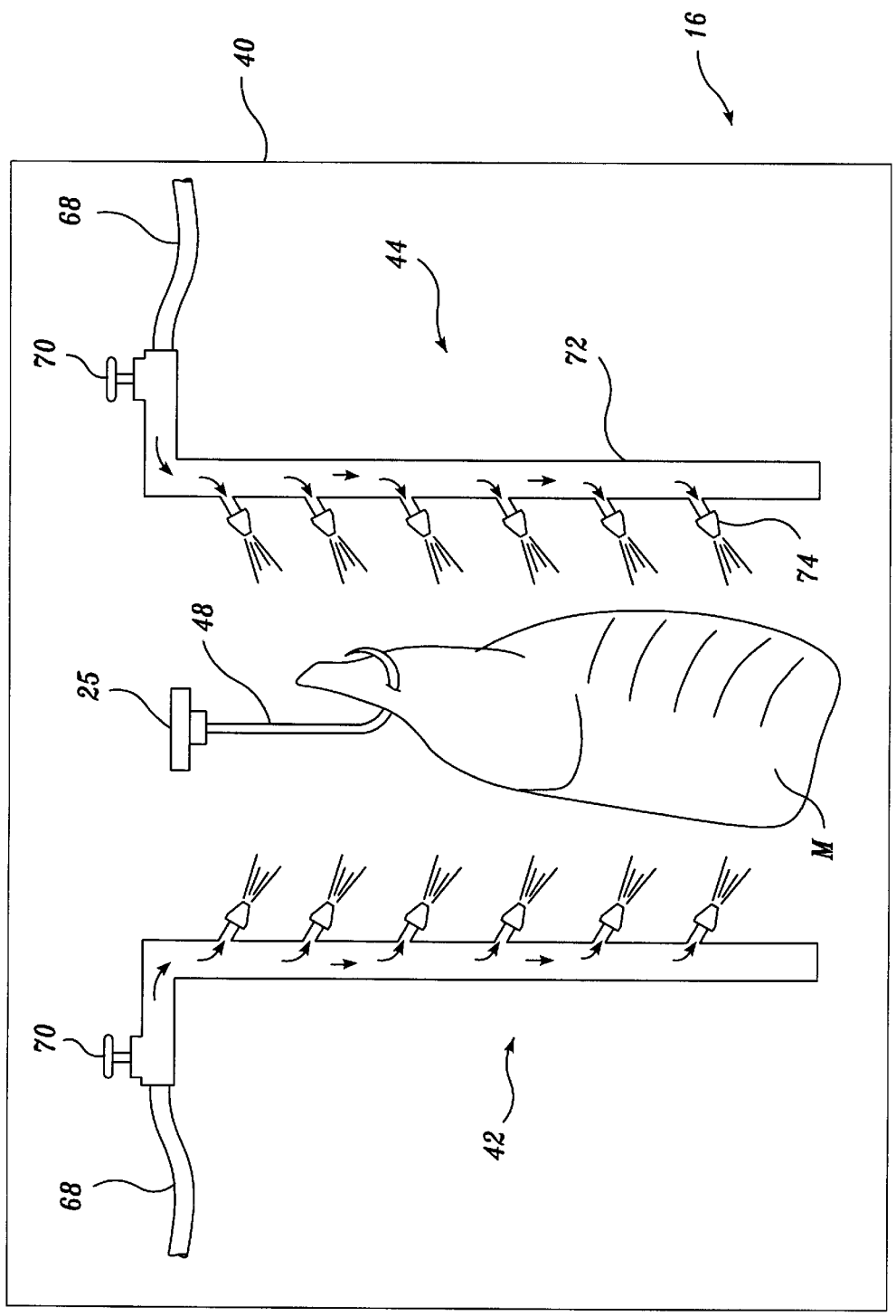
FIG. 4 is a semi-schematic elevational view of the chilled water chamber of the present invention.

Cooling chamber 16 is provided to very rapidly dissipate the heat and thus stop the transfer of heat into meat M. Meat M enters into cooling chamber 16 after it passes through steam chamber exit door 38. See FIG. 4. Once within cooling chamber 16, conveyor 25 transfers meat M between left and right spray banks 42 and 44. Chilled water at preferably about 40° F. is supplied by water supply pipe 68. The water passes through water valve 70 and into water delivery pipes 72. The water is under pressure such that it sprays through water nozzles 74 to contact and thus quickly chill the surface of meat M to remove the heat and provide a final rinse.

Meat M continues along the path of conveyor 25 through processor exit door 46. Meat M exits in a clean state with the surface of meat M effectively pasteurized from any fecal matter and the pathogens that accompany it or other contaminants that may be on the surface of meat M.

In summary, meat M passing through a dewatering chamber to remove excess moisture therefrom prevents surface moisture from absorbing the heat energy from the change of state of the steam in steam chamber 14 to condensation on the surface of meat M. This heat energy effectively destroys the pathogens. Afterwards, the chilled water in cooling chamber 16 rapidly cools the meat so that it is not significantly heated on the surface. This process is clean and effective. It does not employ objectionable chemicals, bacteria, radioactivity, or other expensive processes while ensuring that pathogens such as coliform bacteria, listeria, and salmonella are eliminated from the meat.

FIG. 5 illustrates another preferred embodiment of the present invention. In this embodiment, a processor 110 destroys any disease-carrying material on the surface of the meat while the meat M is moving continuously along a conveyor path. It is not necessary to stop the conveyor path, but if the conveyor should stop while the meat is in the middle of processor 110, the meat is effectively cleansed and cooled.

Processor 110 includes a dewatering station 112, a steam chamber 114, and a cooling chamber 116. The stream chamber 114 and cooling chamber 116 are both contained within an outer enclosure 118. Outer enclosure 118 is generally parallelepiped in shape and includes an outer enclosure floor 119 that is peaked along the longitudinal center line of the floor. The floor 119 slopes towards the outsides of outer enclosure 118 for collection of condensate runoff from the meat. The cross-sectional size of outer enclosure 118 is somewhat larger than the typical size of a unit of meat M. The length of outer enclosure 118 is approximately 33 feet in the embodiment shown in FIG. 5 that is adapted for use with sides of beef. Of course, the size, including the length, of the enclosure may be varied to accommodate different numbers of sides of beef to be treated at the same time and also for different types of meat, e.g., pork or poultry.

The processor 110 resides primarily below a standard conveyor 120 that is within the processing plant. A conveyor 120 includes a track 122 extending generally horizontally above the center of outer enclosure 118. Rollers 124 ride on top of track 122 and are pulled along by a drive chain 125. Hooks 126 extend below rollers 124 and into outer enclosure 118 as they move through processor 110. The meat M hangs from hooks 126 for processing.

The first stage of processor 110 includes dewatering station 112. Dewatering station 112 includes right air bank 128 and left air bank 130 positioned on the right and left sides of conveyor 120 respectively so as to direct a drying fluid, such as air, at the surfaces of meat M before meat M enters outer enclosure 118. As explained above with reference to the previously described embodiment, it is important to remove excess water from the surface of meat M before it enters steam chamber 114 so that effective heat transfer destroys any bacteria residing on the surface of meat M. Ideally, the drying air is directed at the meat shown in FIGS. 5–8 at a pressure of about 15 psig and at a high volume, i.e., of about 7000 cubic feet per minute. Air banks 128 and 130 may alternatively be arranged in a different fashion. Also, other excess water removal methods may be employed.

Steam chamber 114 ideally extends approximately half or less of the length of outer enclosure 118. Also ideally steam chamber 114 rides within outer enclosure 118 at all times. Steam chamber 114 includes side walls 134 for enclosing meat M. The steam chamber is illustrated as sized to accommodate four units of meat M (e.g., carcasses) at the same time. A steam supply header 136 is attached to the top of outer enclosure 118 and directs steam into steam chamber 114 as described below with reference to FIG. 9A. A pair of steam ventilation ducts 138 are also provided, attached to the top of outer enclosure 118 on either side of steam supply header 136. Steam ventilation ducts 138 are used to evacuate the steam S from steam chamber 114 as described below in further detail in connection with FIGS. 9A and 9B.

A protection plenum 140 is provided all along the length of outer enclosure 118 immediately below track 122. Protection plenum 140 is a longitudinal enclosure provided with a negative pressure by pulling a vacuum with protection plenum duct 142 in order to keep any steam seepage from contact with the rest of conveyor 120. Preferably, protection plenum duct 142 is connected to at least two locations along trolley protection plenum 140 in order to create negative pressure within the protection plenum and to thus avoid damage to conveyor 120.

Steam chamber 114 includes support wheels 144 disposed at the bottom of side walls 134. Support wheels 144 support steam chamber 114 above enclosure floor 119 so that steam chamber 114 may move longitudinally within outer enclosure 118.

A chamber drive 146 is attached ideally near the middle of outer enclosure 118 between outer enclosure 118 and steam chamber 114 in order to move steam chamber 114 within outer enclosure 118. Chamber drive 146 preferably includes a servo drive, a brake, a gear motor and a pinion 148. Pinion 148 is positioned at the bottom of chamber drive 146 and along the side of the bottom of steam chamber 114. Racks 150 are provided all along the bottom of side walls 134 of steam chamber 114. Thus, steam chamber 114 may be moved within outer enclosure 118 by rack 150 being driven by pinion 148 of chamber drive 146.

Horizontally disposed guide wheels 152 are also provided to engage the outer surface of rack 150 in order to prevent yaw of steam chamber 114 while it is being moved within outer enclosure 118. Guide wheels 152 are rotatably journeyed on stationary brackets to the inside of outer enclosure 118. Chamber drive 146 is switched on when steam chamber 114 is filled with a desired number of units of meat M and moves steam chamber 114 at substantially the same rate of speed as conveyor 120, such that it moves along with meat M for a set period of time to apply steam S to meat M. Chamber drive 146 then quickly retracts steam chamber 114 to its start position as explained below.

Entrance doors 154 (not shown in FIG. 5) and exit doors 156 are provided on the ends of steam chamber 114 in order to seal the chamber for application of steam S. Door actuators 158 are mounted to side walls 134 of the steam chamber 114 in order to open and close entrance and exit doors 154 and 156.

The downstream end of outer enclosure 118 contains chilled fluid banks 160. Chilled fluid banks 160 include pipes which channel a cooling fluid, preferably water, to coolant nozzles 162. Coolant nozzles 162 are directed to meat M to spray a coolant fluid on the surface of meat M in order to quickly reduce the surface temperature of meat M after steam chamber 114 is retracted from meat M. Once meat M passes between chilled fluid banks 160 harmful surface bacteria has been destroyed and meat M is ready to move on to additional processing steps and shipment to retailers and consumers.

Figure 8:
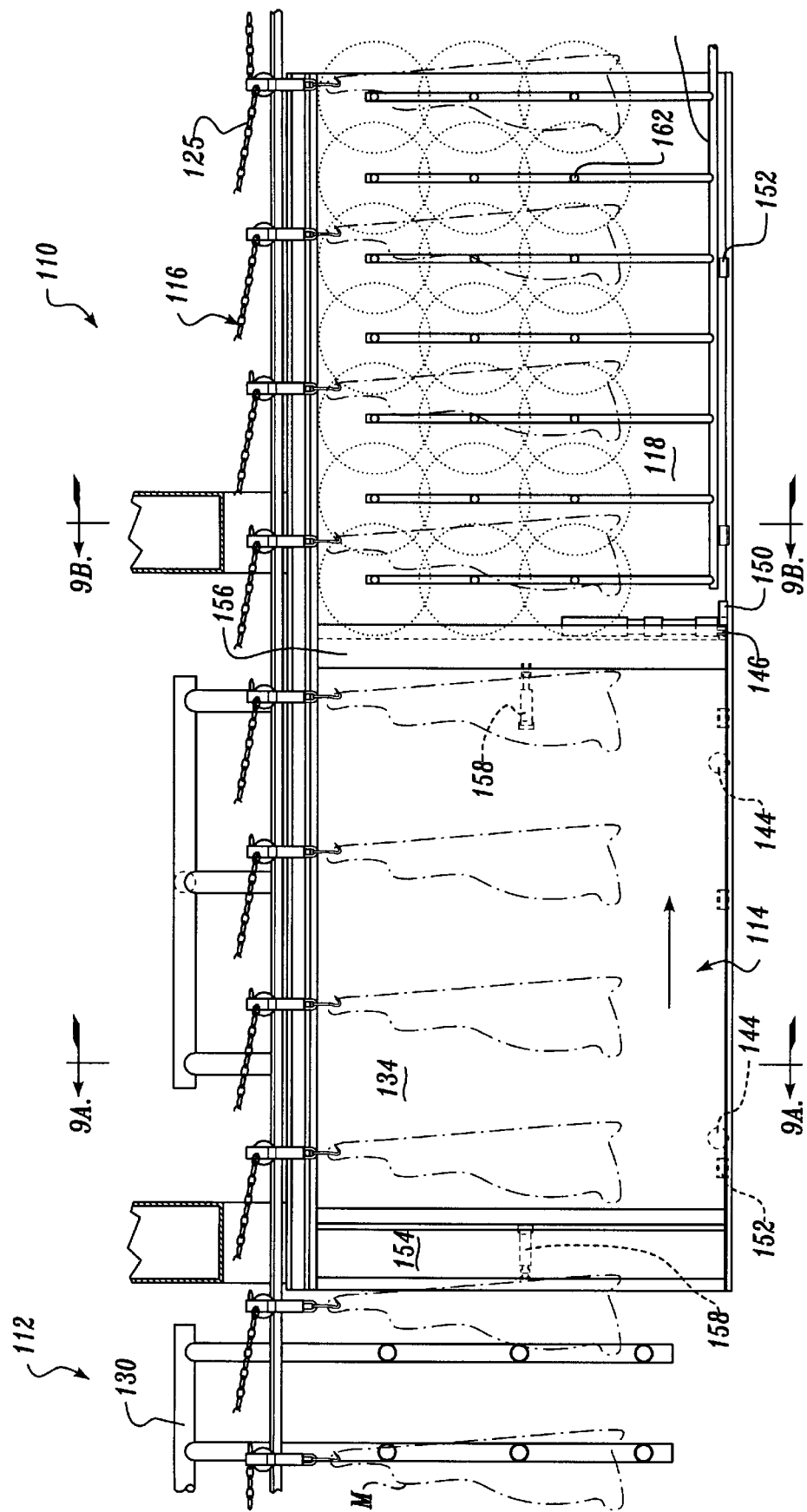
FIG. 8 is a cross-sectional elevational view showing the steam chamber in the position shown in FIG. 6.

FIGS. 6, 7 and 8 illustrate the movement of steam chamber 114 within outer enclosure 118 while meat M is processed with processor 110. Meat M, is supported by and moves along conveyor 120 during the entire process. Ideally the conveyor is moving at a substantially constant speed, but occasionally the conveyor speed may change, or the conveyor may even stop. Nonetheless, the present invention is capable of accommodating this change in conveyor speed.

As meat M enters into outer enclosure 118 it moves through entrance doors 154 into steam chamber 114. The distance between side walls 134 of steam chamber 114 is sufficient to enclose meat M therein. The length of steam chamber 114 is preferably long enough to enclose a desired number of units of meat M. Although four units are shown enclosed in FIGS. 6, 7 and 8, the length of the steam chamber 114 may be designed to accommodate a different number of units and also various types of meat.

Once four units of meat M enter into steam chamber 114, entrance door 154 and exit door 156 are closed by actuators 158. As soon as this occurs, steam chamber 114 begins to move along with meat M at the same rate as the movement of meat M while filling with steam (about 7.1 inches per second). Steam surrounds meat M preferably at a temperature of about 212° F. at sea level for a preferred length of time of 10 seconds. The temperature may be anywhere within the range of about 175° F.–500° F. and preferably surrounds the entire surface of meat M for a period of time between about 5 seconds and 30 seconds. The pressure within the chamber may be positive relative to ambient pressure to maintain steam purity. Temperature measurements are preferably taken at about four locations within steam chamber 114 and used to determine the temperature of the atmosphere within the steam chamber during the present process. Steam chamber 114 is moved within outer enclosure 118 by chamber drives 146 acting on rack 150. Guide wheels 152 stabilize the movement of steam chamber 114 as it moves with meat M.

As seen in FIG. 7, once the desired time for application of steam to the surface of meat M has been met, entrance and exit doors 154 and 156 are opened and steam chamber 114 is quickly retracted back (preferably at about 12 feet per second) to the upstream end of outer enclosure 118 to enclose additional meat M to begin the process over again. Meanwhile, as shown in FIG. 6, meat M that has been treated, continues to move through outer enclosure 118 within cooling chamber 116. Chilled fluid banks 160 spray coolant on the outer surfaces of meat M to rapidly decrease the surface temperature of meat M. This coolant prevents meat M from being cooked at its surface. The coolant W directed at meat M through nozzles 162 may be any coolant fluid such as air, water, or water, perhaps with an antimicrobial agent mixed therein. Specific antimicrobial agents that may be used include lactic acid, trisodium phosphate, acetic acid, and chlorine dioxide.

Should conveyor 120 stop, steam chamber 114 will also be stopped by a switch that is triggered by movement or nonmovement of conveyor 120. Steam continues to be applied to meat M for the desired period of time after which doors 154 and 156 are opened and air is rushed through steam chamber 114 to evacuate steam S and to provide a cooling effect on meat M. Also, simultaneously the flow of chilled fluid may be started, which would assist in rapidly cooling the meat even though the fluid may not be actually spraying the surface of the meat. Thus, processor 110 can process meat with the continually moving line or with inadvertent stops in the line as meat M moves through processor 110. As such, the remaining processes within the plant that may cause conveyor 120 to stop can go on without worry of processor 110 and meat M being adversely affected.

Figure 9A:
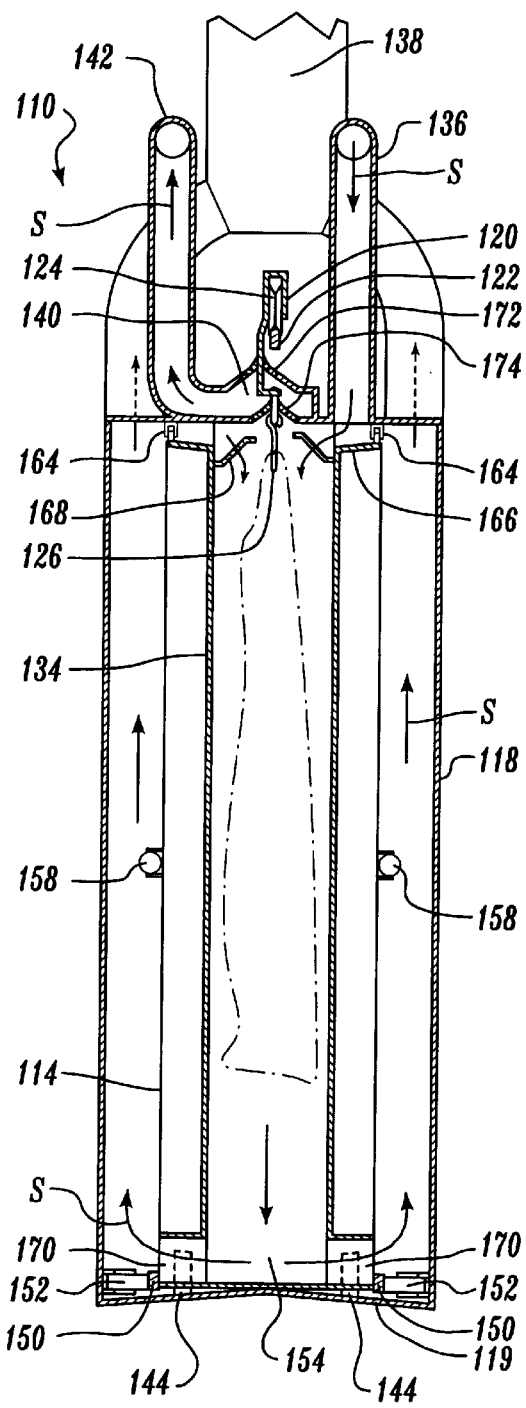
FIG. 9A is a cross-sectional end view showing the circulation of steam through the steam chamber.

FIGS. 9A and B illustrate the movement of steam S through steam chamber 114. FIG. 9A illustrates the steam supply cycle as steam surrounds meat M and simultaneously pushes out any air surrounding meat M. Steam enters through steam supply header 136 through the top of outer enclosure 118. Chamber seals 164 provide a sealing engagement between the top of steam chamber 114 and outer enclosure 118. Steam supply header enters within the inside of chamber seals 164 such that the steam is channeled within side walls 134 of steam chamber 114. First and second deflection plates 166 and 168, respectively, are provided along the top of side walls 134 of steam chamber 114. First deflection plate 166 is nearest to steam supply header 136 and channels steam, as explained below in connection with FIG. 10. Steam then surrounds and moves down along the top and sides of meat M while simultaneously pushing air out the bottom of steam chamber 114 through gas escape openings 170. Gas escape openings 170 are provided along the bottom of steam chamber 114 to allow air and steam to be pulled out of the bottom of steam chamber 114 up and through steam ventilation duct 138. As steam S is pumped into steam chamber 114 the heavier air moves toward the bottom and is pulled out of steam chamber 114 along the sides of steam chamber 114 within outer enclosure 118. Thus, steam uniformly covers the surface of meat M without any substantial air pockets. This ensures that adequate heat transfer takes place at the surface of meat M without any insulating effect of air. The volume of steam supplied to the steam chamber 114 to purge the chamber and treat the meat M is ideally about three to four times the volume of the steam chamber. However, depending on the temperature and pressure of the steam and other factors, more or less steam may be supplied to the steam chamber.

Figure 9B:
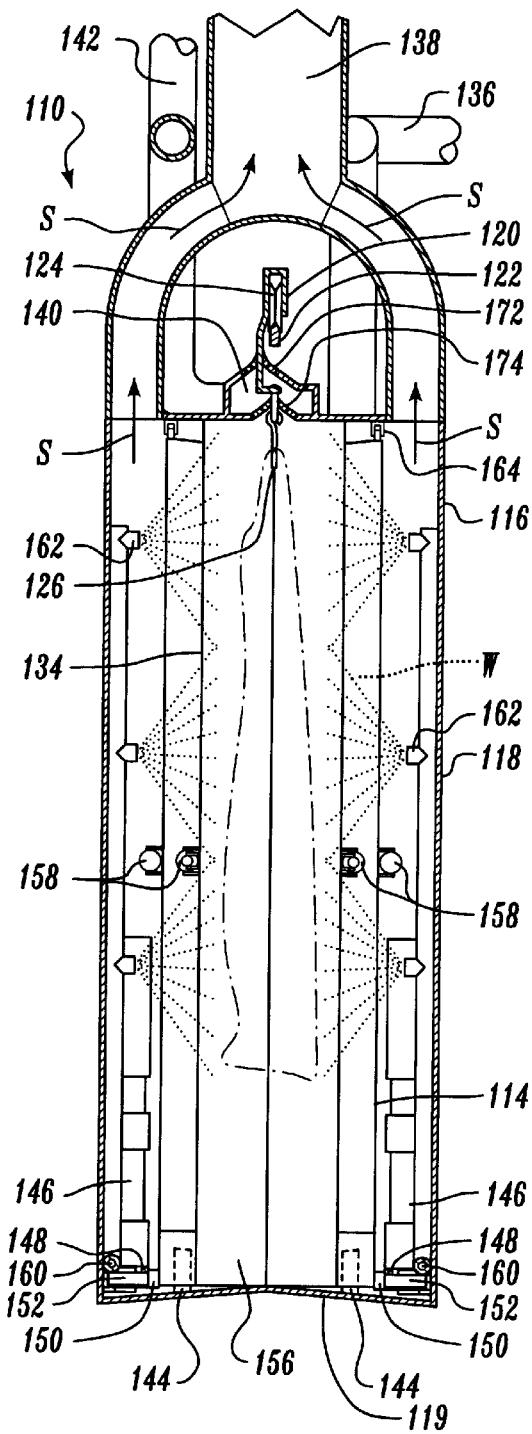
FIG. 9B is a cross-sectional end view showing the coolant water being sprayed on a carcass after the steam chamber has been retracted.

FIG. 9B illustrates the cooling of meat M after steam is evacuated from steam chamber 114 and steam chamber 114 is retracted from meat M which is now advanced to the downstream end of outer enclosure 118.

Figure 10:
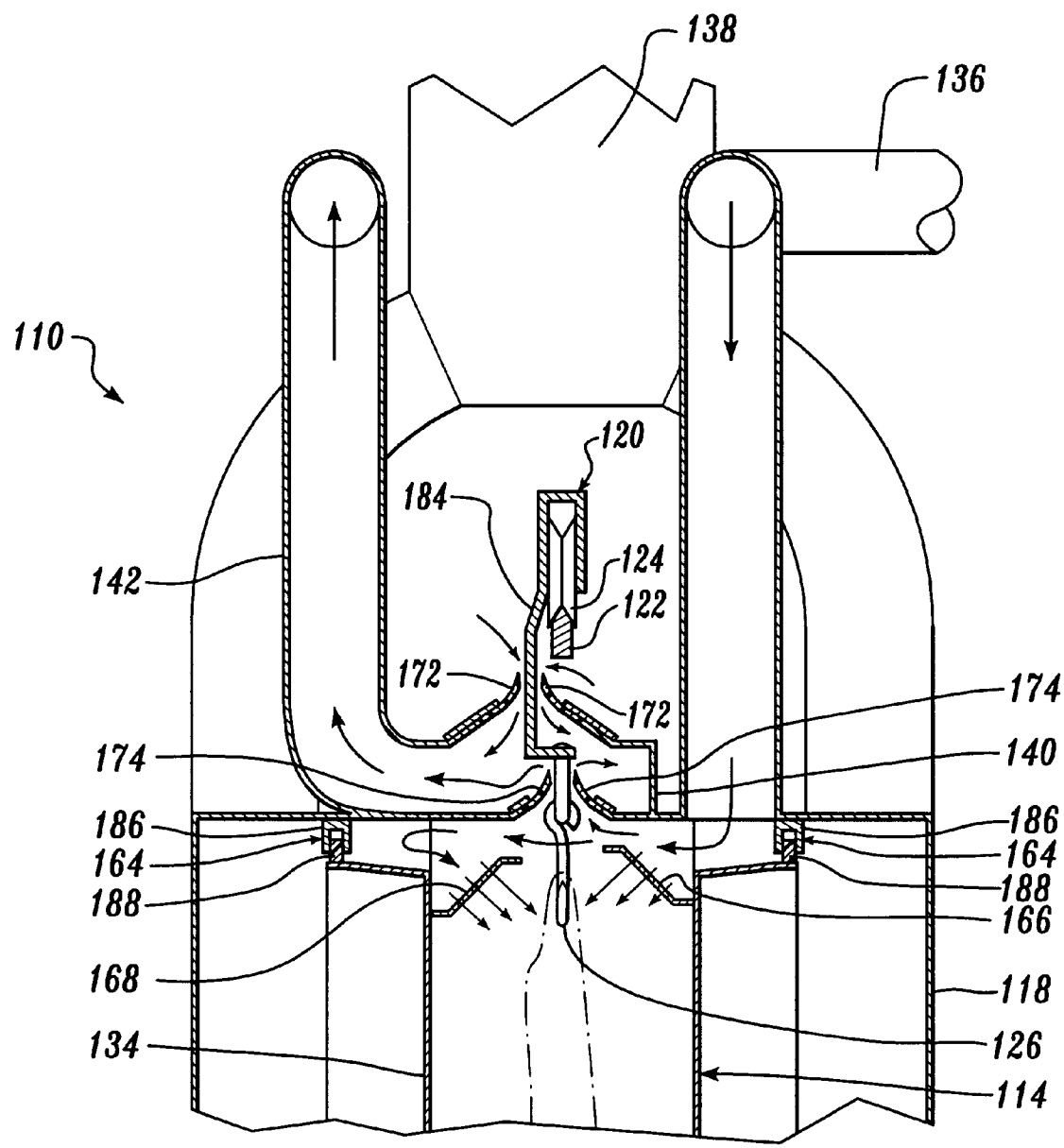
FIG. 10 is a sectional view showing the functioning of the protection plenum ventilation system.

FIG. 10 illustrates in further detail the flow of steam into steam chamber 114, as well as the functioning of protection plenum 140. As steam moves from steam header 136 it is channeled toward meat M with first deflection plate 166. First deflection plate 166 is approximately 40% open with holes formed therein, such that it allows some steam to enter directly to the top of meat M to fill steam chamber 114, while channeling additional steam to the opposite side of meat M to be directed down through second deflection plate 168 which is approximately 60% open. Thus, steam substantially evenly moves down all sides of meat M. Other ratios of openness of deflection plates 166 and 168 may be used depending on the pressure and volume of steam supplied, such that steam moves evenly over the surface of meat M to push air out the bottom of steam chamber 114 so that no pockets of air remain on the surface of meat M.

Also illustrated in further detail are chamber seals 164. Chamber seals 164 include an upper member 186 which is an inverted U-shape and a lower member 188 projecting upwardly from the top of outer wall 132 to meet within upper member 186. Upper members 186 effectively forms a channel beneath the top side of outer enclosure 118. Thus, little or no steam escapes through chamber seal 164.

Protection plenum 140 provides a channel for capturing escaped steam along the top of outer enclosure 118 beneath track 122. Steam is pulled out of protection plenum 140 with plenum ventilation duct 142 such that a negative pressure is maintained within protection plenum 140, relative to the interior of steam chamber 114 and to the ambient air. An upper plenum wiper seal 172 constructed of two strips of flexible rubber or similar material, that are angled upwardly and inwardly toward each, is provided at the top of protection plenum 140 to allow a nominally closed slot through which a conveyor brackets 184 may slide. When a conveyor bracket 184 is not between upper plenum seal 172, the two strips contact against each other to block steam from exiting the plenum. While brackets 184 pass along seal 172 some small openings may occur. However, since a negative pressure relative to the outside environment is maintained, air will be pulled into protection plenum 140 to be evacuated with steam S through plenum ventilation duct 142. Likewise, a lower plenum seal 174 is provided just above hook 126 to seal the lower side of protection plenum 140 and to evacuate any steam that may escape from outer enclosure 118 and from steam chamber 114. Lower plenum seal 174 also includes two rubber strips (or similar material) that are angled upwardly to meet at their uppermost ends and to provide a nominally closed slot through which bracket 184 may slide.

FIGS. 11A and B illustrate the details of exit door 156 (FIG. 11B) and entrance door 154 (FIG. 11A). Exit door 156 includes door arms (halves) 176 that are pivotally attached to side walls 134 for sealing closure therewith. Actuator brackets 178 are secured to the outsides of side walls 134 and include a pivotal attachment to door actuators 158. The opposite end of door actuators 158 are secured to door brackets 180. Thus, retraction of actuator 158 causes door 156 to open while extension of actuators 158 causes door 156 to close. Door 156 includes door arms 176, each attached to a door bracket 180. The free ends of door arms 176 include hook-shaped door seals 182 that may be compressed one to another to provide an effective seal in the middle of door 156. The curved shape of door arms 176, with their connection to actuators 158, allows doors 156 to be opened and closed with minimal movement and space requirements outwardly from inner walls 134. Also, door 156 will open automatically when pushed by meat M.

Entrance doors 154 are somewhat similarly constructed. However, entrance doors 154 include actuators 158 attached to brackets fixed to outwardly extended portions of side walls 134. Side walls 134 flare outwardly near the upstream end of chamber 114 after which they extend in approximately parallel planes to the upstream end of chamber 114. This wider region of side walls 134 is necessary to accommodate the opening of door 154 inside of side walls 134. The pivot point of door arms 176 are at the upstream end of side walls 134. Supports 184 are provided to serve as a pivot for bracket 180 of door arms 176.

Another preferred alternate embodiment of the invention is provided and will be described in connection with FIG. 12. In this embodiment removal of excess surface liquid from the meat M, the application of steam to the meat, and cooling, is all carried out within moveable chamber 214. Except for the elements described below, the aspects of this embodiment are similar to those described above with respect to FIGS. 5–11. For example, an outer enclosure 218, similar to enclosure 118 is provided along with a conveyor 220 and track 222. A protection plenum 240, similar to protection plenum 140 is also provided as well as a plenum duct 242, a steam supply header 236 and a steam ventilation duct 238.

Figure 12:
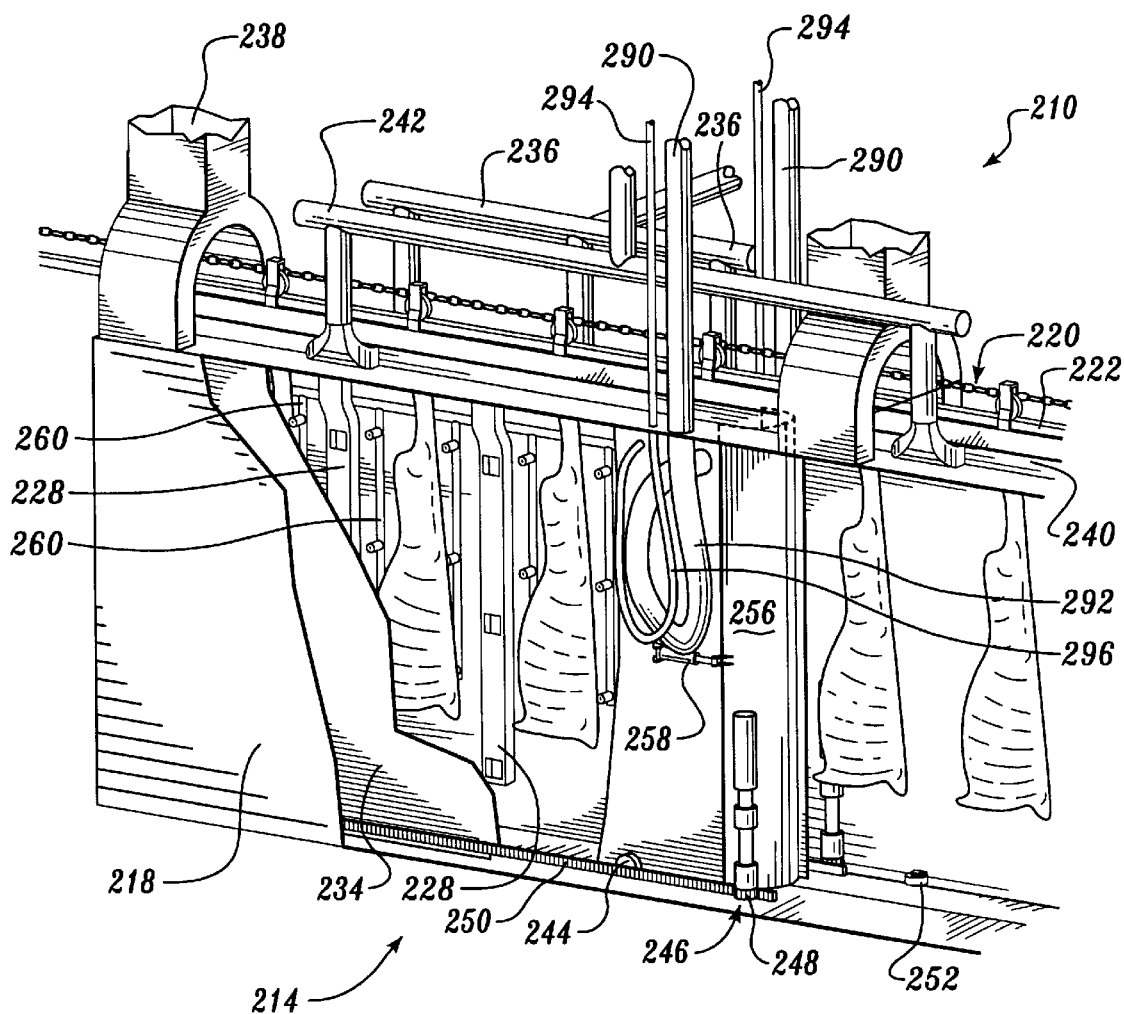
FIG. 12 is an isometric view of an alternate preferred processor including dewatering, steaming, and cooling structures with a moving chamber.

However, in the embodiment of the present invention show in FIG. 12, in order to carry out all steps within chamber 214, air banks 228 and chilled water banks 260 are secured to the inside of side walls 234 of chamber 214. Air banks 228 are illustrated as extending in columns down both of the insides of side walls 234. Air banks 228 include openings for blowing a coolant fluid, such as air, at the surface of meat M to remove excess surface liquid. The excess liquid is removed before steam is applied to the surface of meat M within chamber 214 as meat M moves along conveyor 220. Air banks 228 are connected to air supply lines 290 which extend to within the top of enclosure 218. Air supply lines 290 are coupled to flexible air hoses 292 that extend within chamber 214 to be connected to air banks 228. Flexible air hoses 292 are used with extra length to enable movement of chamber 214, while maintaining a constant connection with fixed air supply lines 290. The fluid for removing excess liquid from meat M may be obtained from fluid supply tanks or simply from ambient air.

Similarly, chilled water banks 260 are connected to flexible coolant hoses 296 that run to coolant supply lines 294. Again, the flexibility of flexible coolant hoses 296 allow chamber 214 to move relative to coolant supply lines 294 while still maintaining a constant supply of coolant fluid for cooling meat M within chamber 214 as meat M moves along conveyor 220.

The process of this alternate embodiment begins with meat M entering into entrance door 254 (not shown). Meat M continues to move as four or other number units (or carcasses) of meat M are enclosed within chamber 214. During this time air banks 228 blow air at the surfaces of meat M to remove any significant amounts of standing liquid, such as water, from the surfaces. Once doors 254 and 256 are closed, and the meat surfaces are sufficiently free from standing water, steam supply header 236 fills chamber 214 with steam for a sufficient amount of time and at such a temperature and pressure to destroy any surface pathogens, as described above in connection with previous embodiments. During this time, chamber 214 continues to move along with meat M on conveyor 220. Steam is then evacuated from chamber 214 with steam ventilation ducts 238 and chilled water banks 260 spray the surface of meat M to cool meat M and prevent any cooking of the meat. Chamber 214 is then be retracted to enclose additional meat to repeat the same process.

Figure 13:
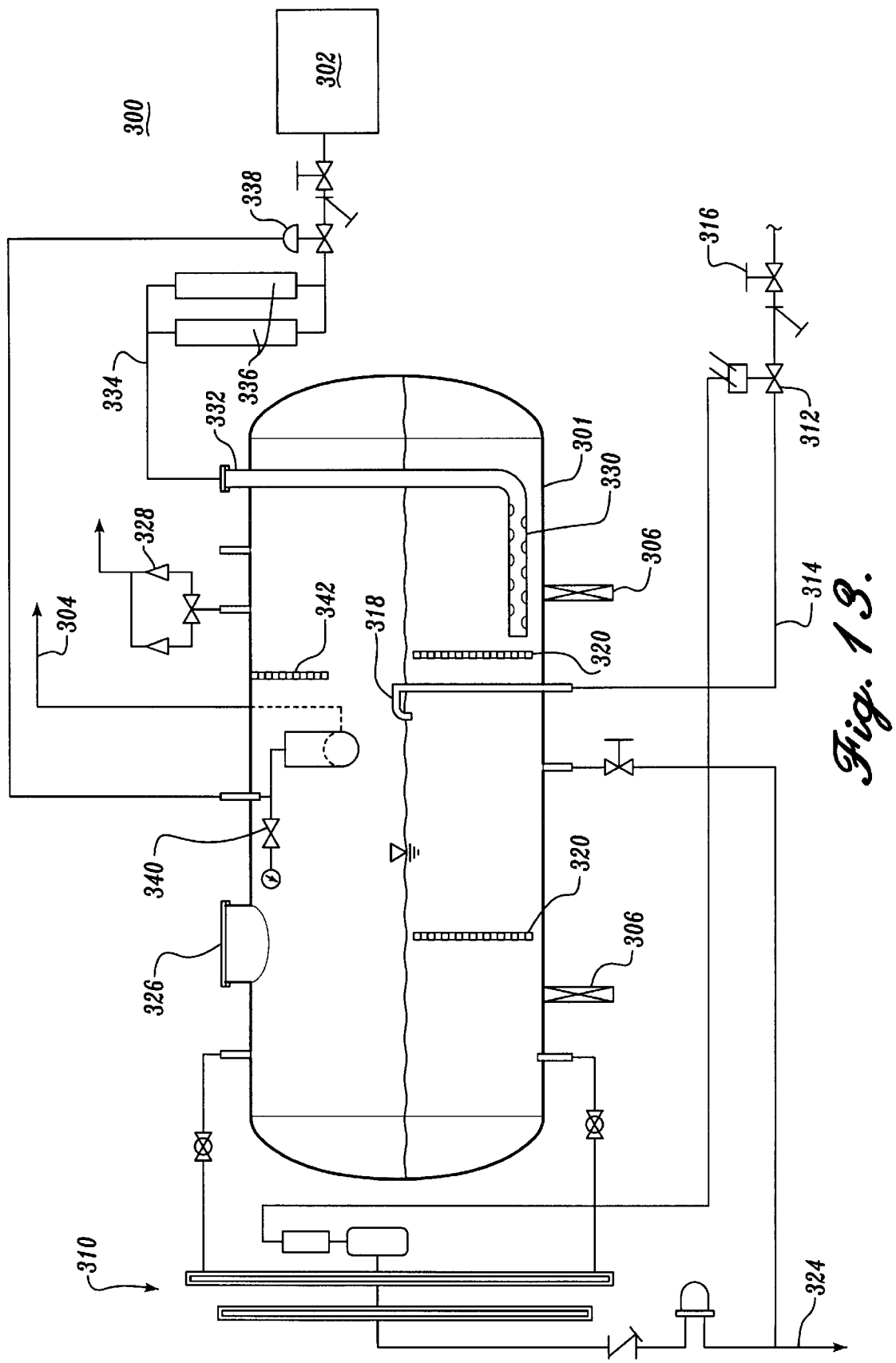
FIG. 13 is a schematic view of a system for generating and supplying steam to the steam chambers of the present invention.

FIG. 13 illustrates applicants' unique system 300 for supplying steam to the steam chambers 14, 114 and 214 in sufficient quality and volume to very quickly purge and fill the steam chambers so that the meat M may be effectively and efficiently treated with the steam to destroy pathogens on the meat. To this end, the steam supply system 300 of the present invention includes a horizontally, elongate steam generation and storage vessel or tank 301 receiving steam from a boiler 302 or other steam source and supplying relatively large volumes of relatively low pressure steam to the steam chambers 14, 114 and 214 through outlet line 304.

To discuss the construction and operation of the steam supply system 300 in more detail, the vessel 301 is supported by spaced apart legs 306 in a standard manner. The vessel 301 is approximately half filled with water as indicated by 308. The water is at a temperature of approximately from 110° Celsius to about 130° Celsius. The level of the water 308 in tank 300 is maintained by a water level control system 310 capable of sensing the water level in the tank and controlling valve 312 operably disposed in water supply line 314. Ideally, a manual shutoff valve 316 is also disposed in water supply line 314 upstream of valve 312. The makeup water is introduced into vessel 301 through an inlet 318 located at an elevation somewhat below the top of the water line. A pair of transverse baffles 320 are mounted within the interior of the vessel 301 to restrict the shifting of the water 308 longitudinally within the vessel 301 during, for instance, introduction of supply steam into the tank, as discussed more fully below. In a preferred embodiment of the present invention, the baffles are approximately 50% open.

The vessel 301 is fitted with an outlet valve 322 connected in fluid flow communication to the drain 324. The valve 322 may be used to flush the vessel 301. Also, an inspection manway 326 is built into the top of the tank 301 to allow personnel entrance into the interior of the tank.

The vessel further includes a relief valve system 328 to relieve the pressure of the steam within the vessel if necessary. During operation, the steam produced by the supply system of the present invention exits the vessel 301 at about 21 psia to about 50 psia. Of course, the pressure of the steam exiting the vessel may have to be altered depending on various factors, including the pressure drop experienced in the steam between vessel 301 and the steam chambers 14, 114 and 214, as well as the desired volumetric flow rate of the steam supplied at the steam chambers. In one embodiment, vessel 301 ideally is constructed from stainless steel at an ASME/CSA rating of 60 pounds/300 cubic feet steam service. The relief valve system 328 is used to make sure that the pressure of the steam within the vessel 301 does not exceed safe limits.

Saturated dry steam at from approximately 60 to 100 psia and at about from 144 to 164 degrees Celsius is supplied to vessel 301 through an inlet pipe 330 having an exterior nipple 332 connected to supply line 334 receiving this charging steam from a boiler 302 or other type of steam supply. Filters 336 are interposed in supply line 334 to filter out impurities therein. The pressure of the steam within the supply line 334 is controlled by a pressure control valve 338.

It is to be appreciated that the water in vessel 301 may be heated other than by use of charging steam. For instance, the water could be heated directly by an electrically or gas fueled heater or by steam heating coils.

Steam from vessel 301 is directed to the steam chambers 14, 114 and 214 through an outlet line 304 located at an upper central portion of the vessel. A monitoring system 340 monitors the temperature and pressure of the steam exiting the vessel 301 through line 304, which monitoring system is operably connected to valve 338 in the steam supply line 334. A steam baffle 342 is transversely located in the upper elevator of the vessel 301 to enhance the mixing of the steam within the vessel.

It will be appreciated that in the steam supply system of the present invention, the water 308 stored within the vessel 301 serves as a heat energy reservoir capable of being utilized to very rapidly generate relatively large volumes of steam. This is important in that to flush the steam treatment chambers 14, 114 and 214, steam at a volume of approximately three to four times the volume of the steam chambers is required to be introduced into the steam chambers very rapidly. Essentially, large charges of steam are instantaneously required by the steam treatment chambers 14, 114 and 214. The steam supply system of the present invention is capable of supplying such relatively large volumes of steam. To this end, ideally the volume of water in vessel 301 is about from 1/10 to 1/5 of the volume of the steam treatment chambers. Also, ideally the water in the vessel 301 occupies about from 1/3 to 2/3 of the volume of the vessel.

It will be appreciated that if steam were supplied to the steam treatment chambers 14, 114 and 214 from a storage vessel of pure steam, such storage vessel would have to be significantly larger in size than vessel 301 to be able to supply the steam at a rate fast enough to purge the steam treatment chambers and fill the chambers with treatment steam at a pace required by the present invention. If the steam were pressurized in an attempt to reduce the volume of such steam storage vessel, it is possible that the pressurized steam could cause hot spots and other damage to the meat being treated within the treatment chambers 14, 114 and 214. However, through the present invention, applicants are able to supply large volumes of relatively low pressure steam to the steam treatment chambers 14, 114 and 214.

FIGS. 14–19 illustrate a further embodiment of the present invention. In this embodiment, a processor 410 destroys bacteria and other pathogens from the surface of meat M while moving along a conveyor path. Although in this particular embodiment, as well as in others described above, the processor is illustrated and described as being used in conjunction with meat M, other food items, including vegetables, could be processed using the present invention.

Processor 410 may include a moisture removal station 412, a steam chamber 414, and a cooling chamber 416. The steam chamber and cooling chamber are illustrated as integrated into a single structure, but instead could be separate structures. An entrance door structure 418 leads into the steam chamber and an exit door structure 420 leads out of the steam chamber. As will be appreciated, the processor 410 includes structures somewhat similar to that described above in conjunction with other embodiments of the present invention. Thus, the following description will focus primarily on those aspects of processor 410 that differ from the processors described above.

The meat M is carried along a standard conveyor 422 composed of a track 424 and hook assemblies 425 engaged with the track to ride therealong. The hook assemblies include hooks 426 that are of the standard type used in slaughterhouses and meat packing plants for supporting meat M. The hooks 426 depend downwardly from a formed shank 429 that is axled to a roller 428 that rides along the upper edge of track 424. The rollers 428, and their associated hooks 426, are pulled along the track 424 by a chain or other type of line, not shown.

Figure 14:
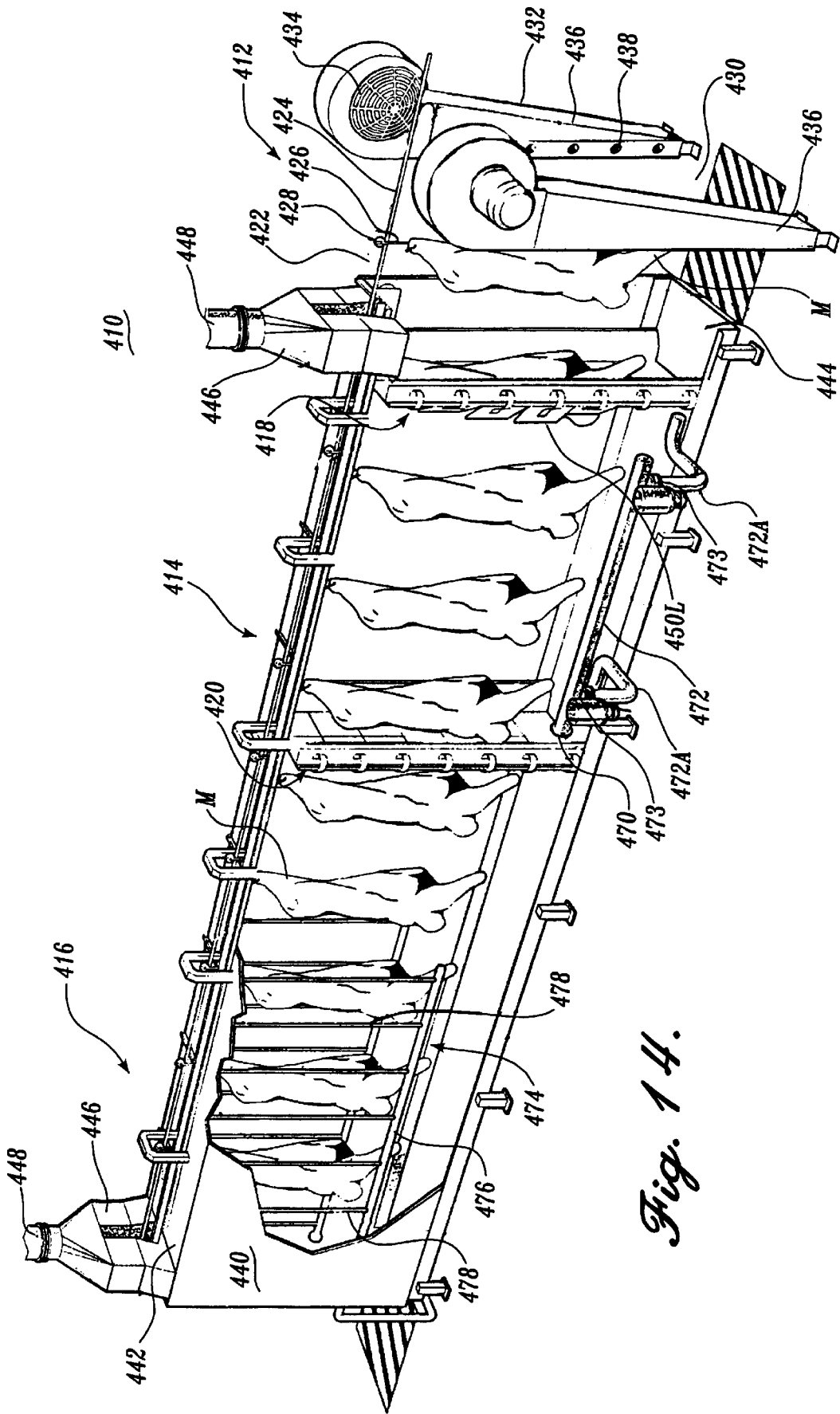
FIG. 14 is a view, partially in schematic, of a further preferred embodiment of the present invention, including a moisture removing station, a steam chamber, and a cooling chamber.

Referring primarily to FIG. 14, the moisture removal station 412 includes left and right air banks 430 and 432 spaced on opposite sides of conveyor 422. The air banks have high volume blowers 434 positioned at the top of downwardly tapered manifolds 436. Outlet openings 438 are spaced apart along the height of the manifolds to direct high volume air at the meat M before the meat M enters the steam chamber. Nozzles (not shown) could be positioned at outlet openings 438 to control the air flow pattern exiting the outlet openings, for instance to achieve a vertical fan pattern, to help ensure that the high volume air reaches the entire surface area of the meat M. The high volume air removes excessive water, blood, and other liquids from the surface of the meat before entering the steam chamber 414. The high volume air is also capable of removing particulate matter from the exterior of the meat. Ideally, the moisture removal air is directed at the meat at a pressure of about 2 inches water column static pressure and a volume of about 9,000 cubic feet per minute.

It will be appreciated that the air banks 432 and 434 may be constructed other than as illustrated in FIG. 14, and further, moisture may be removed from the meat by techniques other than using high volume air. In addition, the water removal station could be partially or fully enclosed so as to prevent the air from blowing into other areas of the processing plant. To this end, an exhaust fan could be used in conjunction with the partial or full enclosure.

In some situations, the moisture removal station may not be needed, for instance, if the food is already in dry condition. Also, in some religions water is not supposed to be used in the slaughtering process. Nonetheless, the high volume air may still advantageously remove blood and particulate matter from the exterior of the meat M prior to steam pasteurization.

Figure 15:
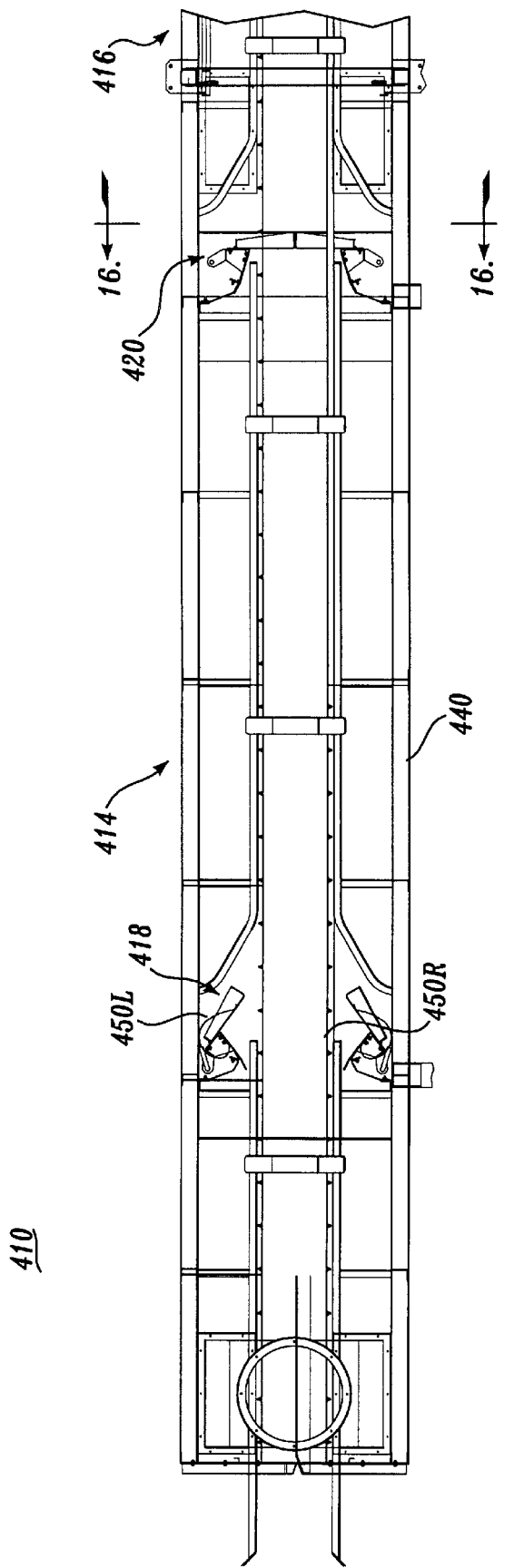
FIG. 15 is a partial top view of the embodiment of FIG. 14.
Figure 16:
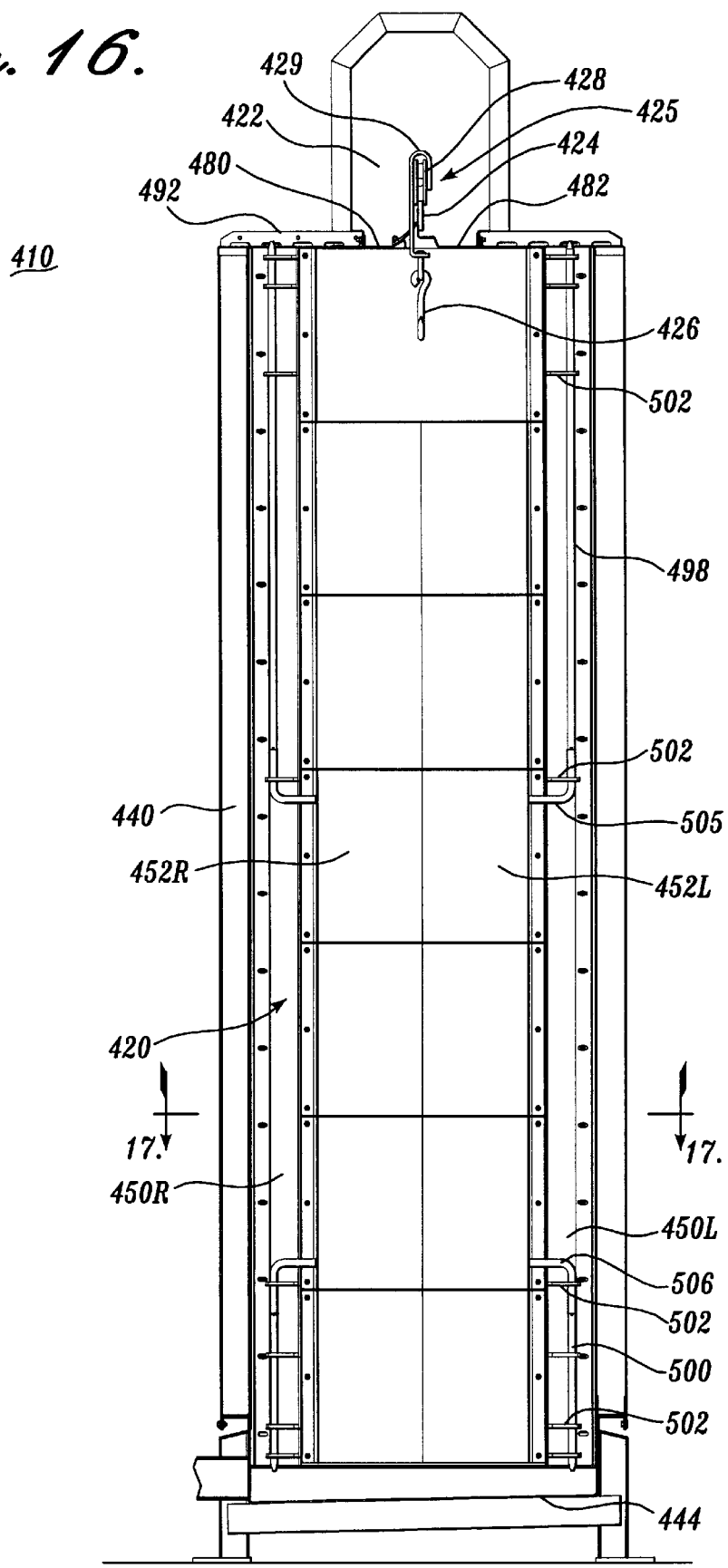
FIG. 16 is an end view of the embodiment of FIG. 15 taken at lines 16—16 thereof.

Additionally referring to FIGS. 15 and 16, the stationary steam chamber 414 has an entrance end adjacent the moisture removal station 412. The steam chamber 414 is shown in the form of an upright rectilinear shape and is illustrated as being integrally constructed with the cooling chamber 416. To this end, the steam chamber and cooling chambers are encased within sidewalls 440, a top or ceiling 442, and a bottom or floor 444. The entrance to the steam chamber 414 is closed off by a door structure 418, and the exit to the steam chamber is closed off by a second door structure 420 leading into the cooling chamber 416. The exit end of the cooling chamber may be open or nominally closed by a further door structure, not shown.

Exhaust manifolds or hoods 446 extend upwardly from openings formed in the ceiling 442 to connect with the lower ends of exhaust pipes 448 to draw air, moisture, and steam away from processor 410 so as to minimize disruption or contamination of the atmosphere within the processing plant. The lower portions of exhaust manifolds 446 are bifurcated to define a central gap to provide a clearance passageway for the conveyor 422.

The door structures 418 and 420 of the steam chamber 414 are similar in construction, and thus the following description will apply to both sets of door structures. The door structures 418 and 420 are composed of a left door set 450L and a right door set 450R. It will be appreciated that the door sets 450L and 450R are mirror images of each other. Each of these door sets is in turn composed of a plurality of separate, closely vertically arranged door segments 452L and 452R.

Figure 17:
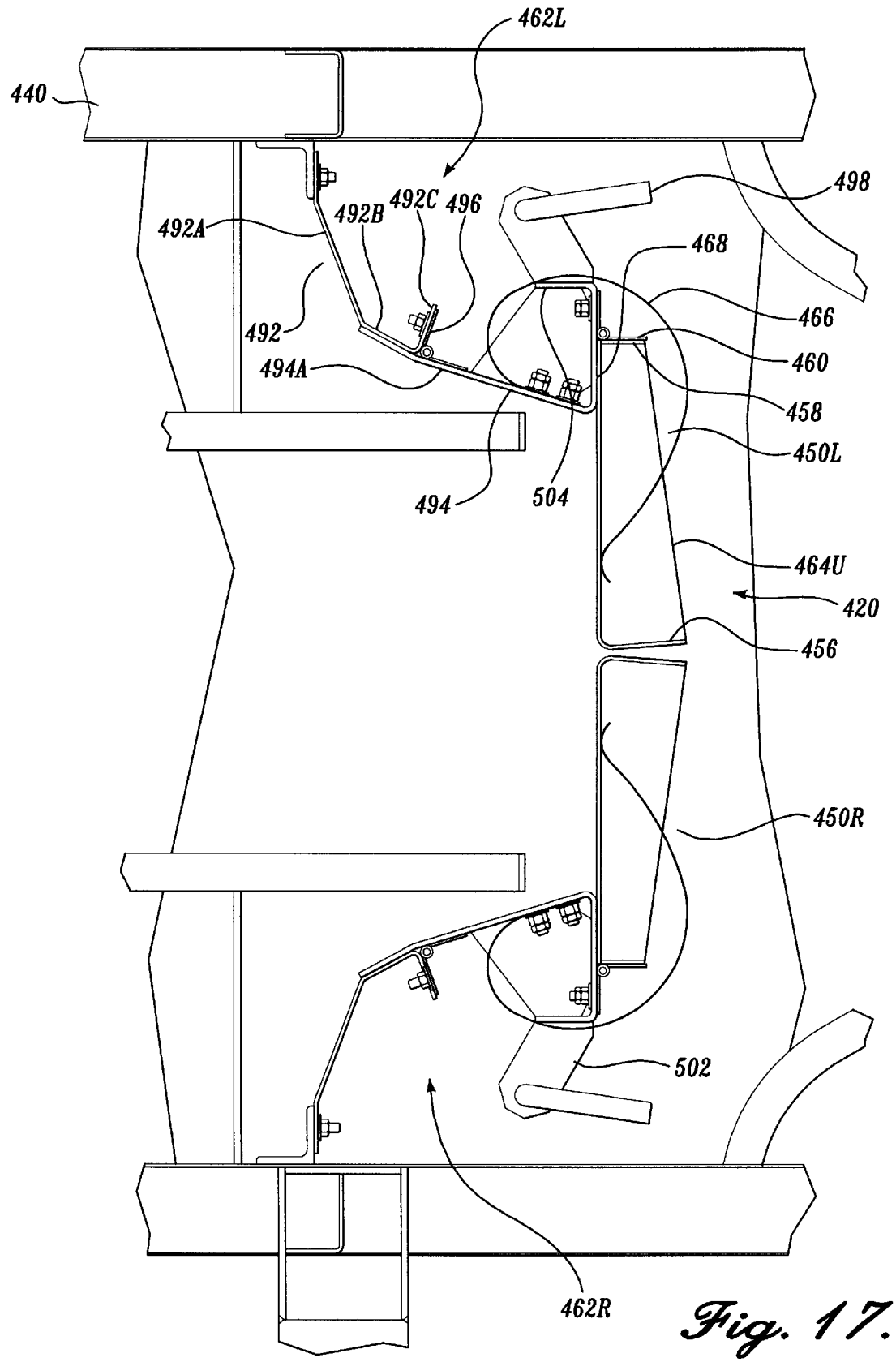
FIG. 17 is an enlarged fragmentary view of a portion of FIG. 15; illustrating the doors of the steam chamber in closed position.

Each of the door segments 452L and 452R include a flat panel portion 454 as well as side edge flanges 456 and 458 extending along the panel portion. The flange 456, which extends substantially transversely from the panel portion 454, is connected to a piano-type hinge assembly 460, used to mount the door segment to a formed door support structure 462. As shown in FIG. 17, the door support structures 462L and 462R flare inwardly from the sidewalls 440 of the steam chamber 414. Constructing the door support structures in this manner enables the structures to serve as a narrowing chute or funnel so as to help reduce any significant side-to-side sway in the meat M moving through processor 410. Also this allows the doors to be constructed more narrowly. As a result, less steam escapes from chamber 414 than if the doors were of wider construction.

Figure 18:
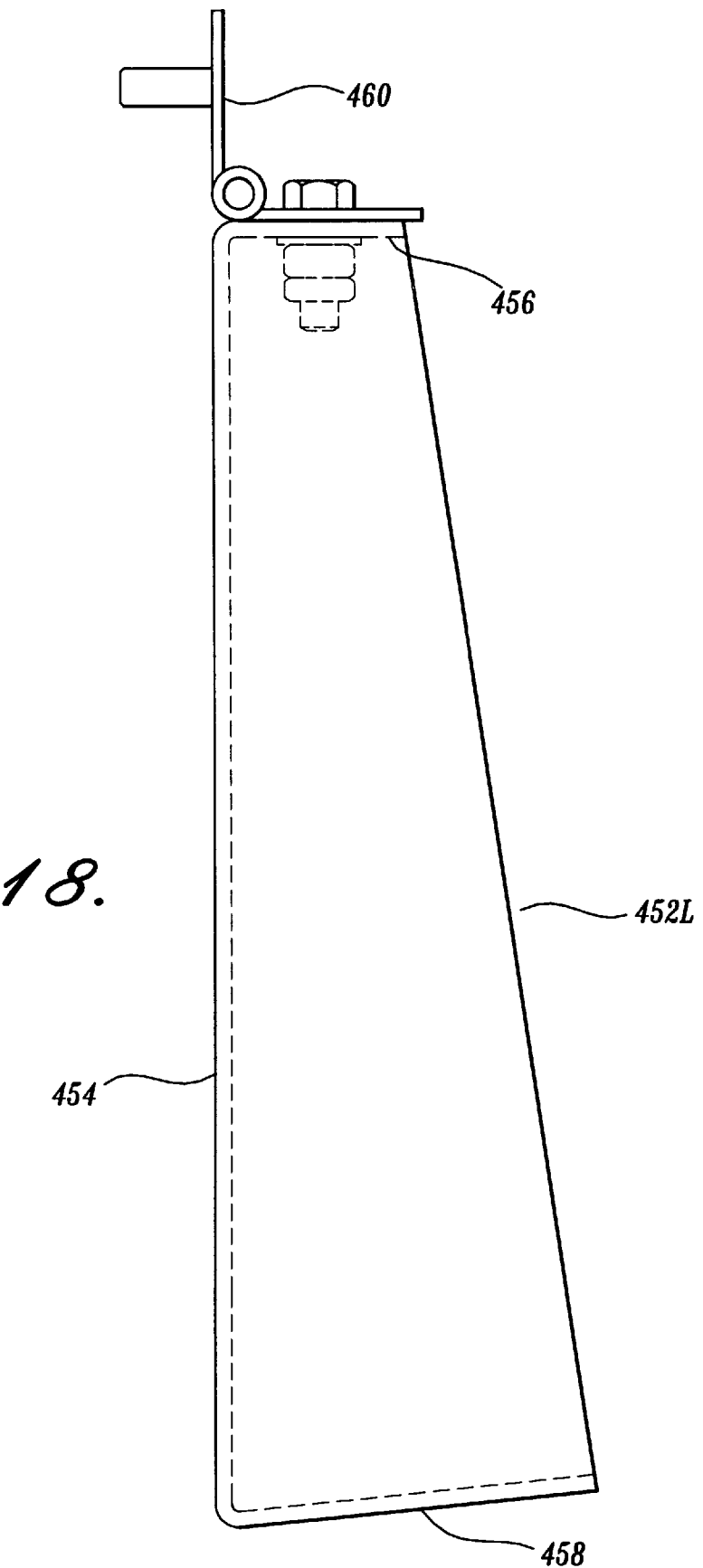
FIG. 18 is a top view of a closure door segment.
Figure 19:
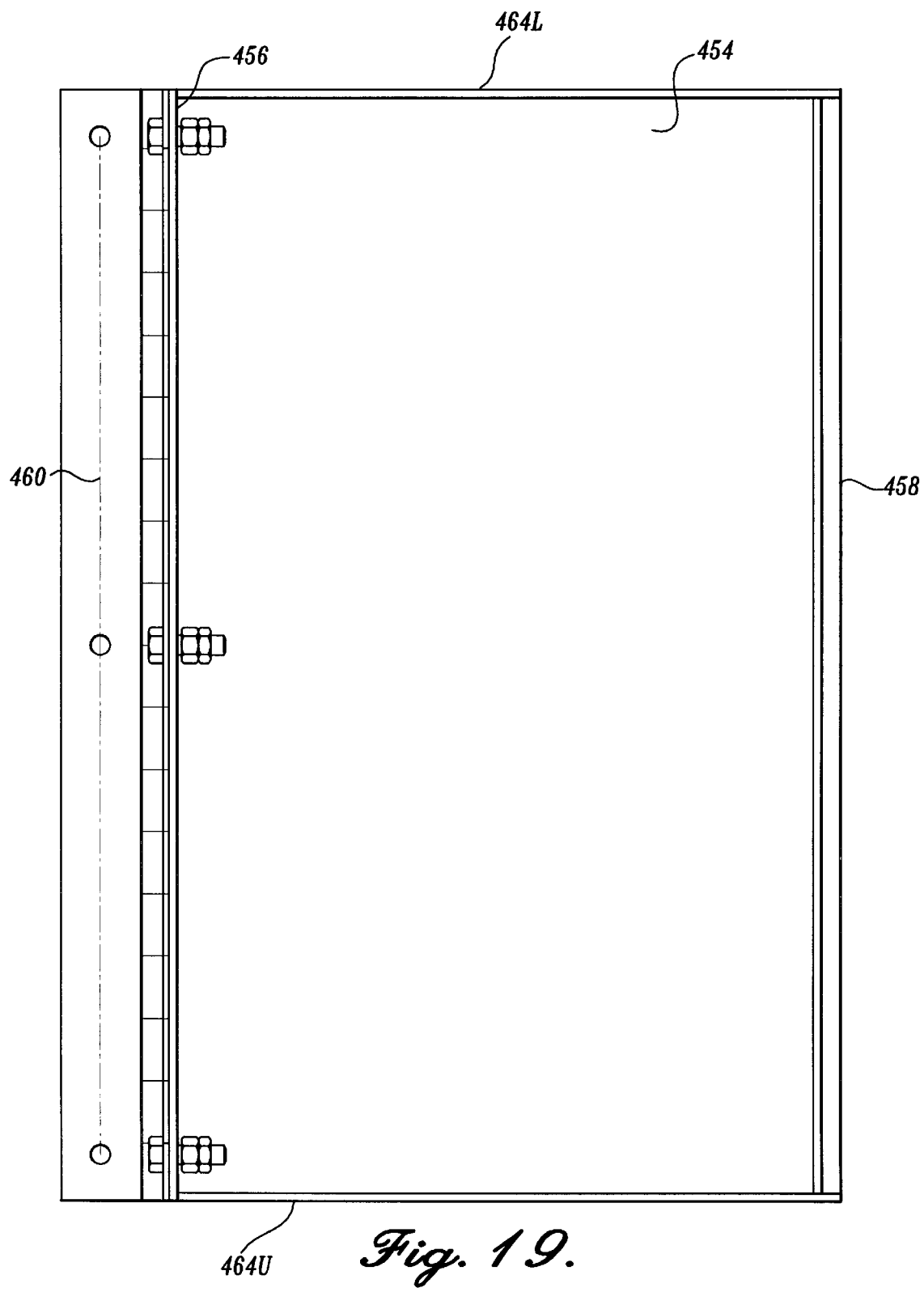
FIG. 19 is a front elevational view of the door segment of FIG. 18.

Referring primarily to FIGS. 17 and 18, the flange 458 is wider through flange 456 and does not extend exactly perpendicularly from panel portion 454, but at a slightly acute angle from the panel portion. This allows the door segment to swing freely relative to the corresponding door segment of the opposite door set.

Each door segment 452L and 452R is constructed with upper and lower flanges 464U and 464L spanning between the side edge flanges 456 and 458. These upper and lower flanges advantageously cooperate with the adjacent flanges of the adjacent door segments to maintain a relatively close seal between the door segments, even if the two adjacent door segments are open or closed a differing amount relative to each other. If desired, a wiper seal or other type of seal (not shown) could be mounted on a top side of the upper flange 464U and/or the bottom side of the lower flange 464L to create a closer seal with the adjacent door segment. However, in most instances such wiper seal or other type of seal will not be necessary. As shown in FIG. 16, the door segments 452 are vertically spaced very close to each other so that the flanges 464U of a lower segment are in close face-to-face relationship with the lower flange 464L of an adjacent upper located segment.

Referring primarily to FIGS. 15 and 17, each of the door segments 452L and 452R is biased into normally closed position by a curved, formed spring 466 having one end mounted to the exterior of the left or right door support structure 462L or 462R and then curving around the outside edge of the door segment, including outer flange 456, to bear against panel portion 454. When the spring 466 holds the door segment 452 in a closed position, the panel portion 454 of the door segment is in face-to-face relationship with a transverse panel section 468 of the door support structure 462. Thus, the transverse panel section 468 serves as a door stop and allows the door segments to open only in one direction. The formed spring 466 advantageously is very durable, easily cleaned, and provides a fairly constant biasing load on the door segment relatively independent of the extent that the door is opened. The spring 466 does not have any tightly wound coils, interior surfaces or other locations at which bacteria or other foreign matter might collect.

At times it is desirable to gain entry into the steam chamber 414 without having to operate the swinging doors 420, for instance, when cleaning the interior of the steam chamber. To this end, as shown perhaps mostly clearly in FIGS. 17 and 17A, the door support structure 462 is composed of two primary components, outward formed panel 492 and inward formed panel 494. The outward panel 492 is constructed with a first panel section 492A extending transversely inwardly and slightly diagonally forwardly (toward the right-hand side in FIGS. 17 and 17A) from chamber outer wall 440, and a second panel section 492B extending further inwardly but diagonally more forwardly than first panel 492A. A flange 492C extends generally transversely to second panel section 492B. The inward panel 494 includes a first diagonal panel section 494A and a second transverse panel section 468 disposed nominally substantially transversely to the length of the steam chamber. As discussed above, panel section 468 supports hinge assembly 460 and also serves as a door stop for the door segments 452.

Figure 17A:
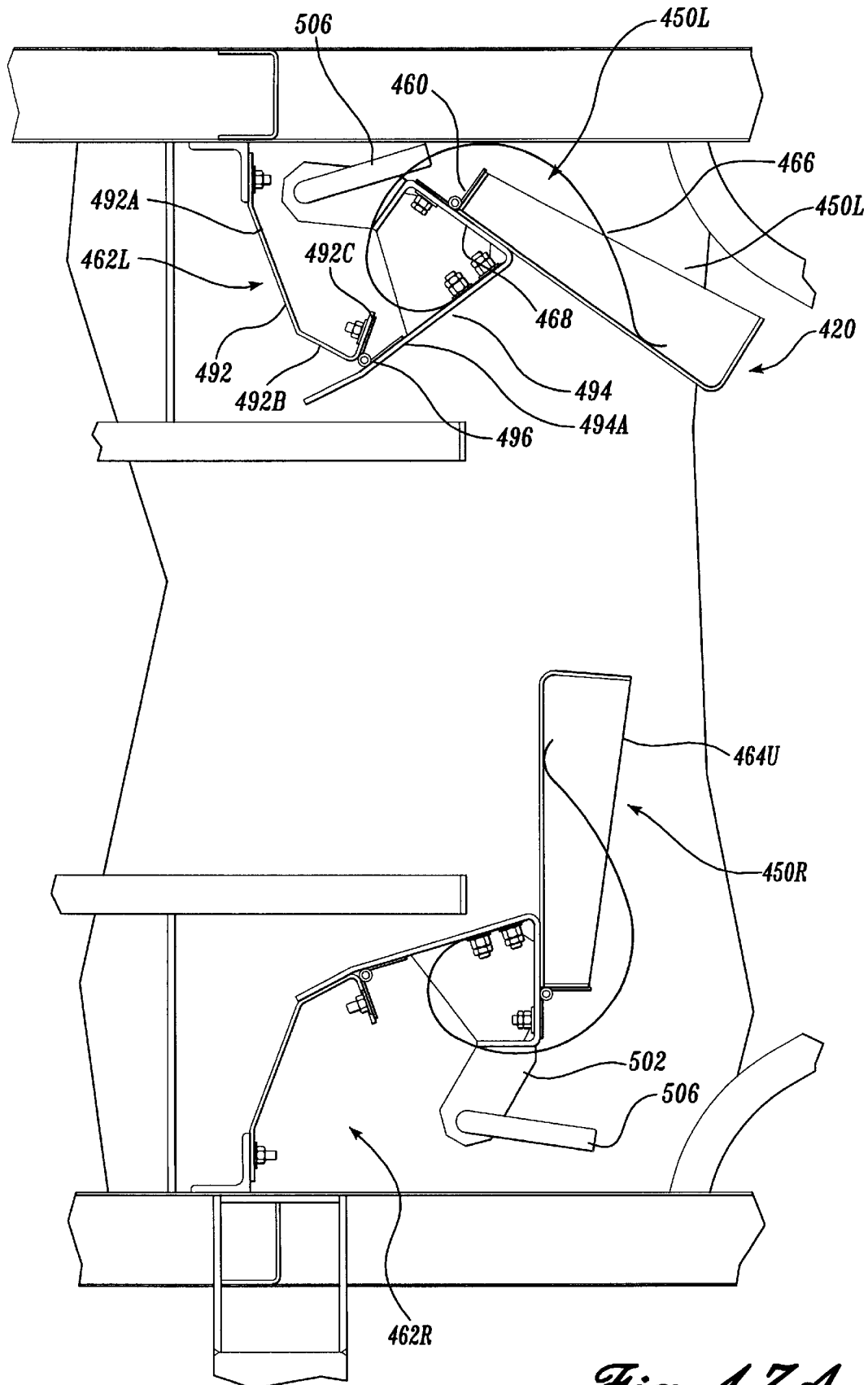
FIG. 17A is a view similar to FIG. 17, but illustrating one of the steam chamber door sets in open position.

The two wall panels 492 and 494 are pivotable relative to each other by a piano hinge assembly 496. One leaf of the hinge assembly is secured to panel flange 492C, with the other leaf secured to panel segment 494A. As shown in FIG. 17A, this construction allows the inward panel 494 to pivot about the hinge assembly 496 so as to open the entire left door set 450L in unison. The right door set can be similarly opened. As shown in FIGS. 17 and 17A, when the door sets are in nominally closed position, a portion of panel section 494A lies in face-to-face relationship with panel section 492B, thereby to "fix" the closed position of the inward panel 494. When the panel 494 is in full open position, spring 466 bears against the inside of chamber wall 440.

Referring additionally to FIG. 16, the panel 494 is maintained in nominally closed position by elongate upper locking pins 498 and lower locking pins 500, located at the upper and lower portions of the door sets 450L and 450R. These locking pins are carried by a series of vertically spread-apart guide brackets 502 that extend horizontally outwardly from flanges 504 formed on the inward panels 494. The brackets include a guide hole for receiving the locking pins and allowing the pins to slide vertically and rotate relative to the brackets. The upper locking pins 498 extend from the ceiling of the steam chamber down to about the mid-height of the chamber to terminate at a horizontal handle portion 505, which can be used to manually draw locking pin 498 downwardly to retract the upper end of the locking pin from a receiving hole (not shown) formed in the ceiling of the steam chamber. The upper locking pins 498 are spring-loaded into upwardly engaged position by a compression spring (not shown) engaged over the pin and pressing against a bracket 502 in a standard manner. Correspondingly, the lower locking pins 500 extend upwardly from the floor of the steam chamber to terminate at horizontal handled portions 506, which can be used to manually draw the locking pins 500 upwardly to retract the lower ends of the locking pins from receiving holes (not shown) formed in the floor of the steam chamber. Ideally, the lower handle portion 506 is positioned at a vertical elevation high enough to enable an operator to conveniently grasp both handle portions 506 and 504 at the same time to simultaneously disengage or engage the locking pins 500 and 498, respectively. As in the upper locking pin 498, the lower locking pin is also spring-loaded, but in a downwardly engaged position by a compression spring (not shown) engaged over the pin 500 and pressing against a bracket 502 in a standard manner.

As shown in FIG. 14, the door segments 452 are opened by the meat M pushing against the door segments, thereby overcoming the biasing affect of the springs 466. Moreover, the door segments, being independent of each other, need open only wide enough to allow the adjacent portion of the meat M to pass thereby. As a consequence, the loss of steam from the chamber 414 as the meat M enters and exits the chamber is significantly less than if each door set 450L and 450R were composed of a singular full height panel, which would have to be opened wide enough to allow passage of the widest portion of the meat M.

Although the door segments 452L and 452R are illustrated as composed of flat panel sections 454, the panel sections can be curved or formed in various shapes to accommodate the particular type of meat M or other food being treated. Also, the number of door segments used to form a door set 450 may vary depending on the size and variation in shape of the meat M or other food being treated. Typically, at least three door segments and up to perhaps ten door segments might be used to construct a door set 450.

Referring specifically to FIG. 16, the top of the steam chamber 414 is sealed by formed panels 480 and 482, which are mounted to the inward end portions of ceiling members 442. A gap extends between the two panel members to allow passage of the hook assemblies 425 therebetween. This gap is nominally closed off by a pair of flat, lip-type seals 484 and 486 that extend along the length of panel 480 and are attached thereto by appropriate hardware members. As shown in FIG. 16, the lower seal 486 bears against the adjacent face of the vertical leg portion 488 of bracket 482. The upper seal 484 bears against a spacer block 490 that extends along the upper portion of bracket leg 488. Ideally, the spacer block 490 is of a width closely corresponding to the gap between bracket leg 488 and the adjacent surface of hook assembly shank 429. It will be appreciated that as the hook assembly 425 passes along the steam chamber 414, the flexible seals 484 and 486 will deflect away from bracket 488 to allow passage of hook assembly shank 429.

Next, referring specifically to FIG. 14, steam is supplied to chamber 414 through a supply duct (not shown) from a steam supply source, for instance, system 300 discussed above. The supply duct is connected to the end 470 of a longitudinal header or manifold 472 which is at an elevation slightly above the floor 422. The manifold includes outlet pipes 472A to introduce steam into the chamber 414 at each end of the chamber. Applicants have found that introducing steam into the chamber near the bottom of the chamber effectively disburses the steam throughout the chamber in a rapid, uniform manner. Moreover, although a singular manifold 472 is illustrated, additional manifolds may be utilized, for instance on the opposite side of the chamber 414.

The amount of steam introduced into chamber 414 is controlled so as to have an adequate amount to rapidly and effectively pasteurize the meat M. To this end, valves 473 are interposed between manifold 472 and outlet pipes 472A to control the amount of steam discharged from the manifold. Temperature sensors (not shown) are located within chamber 414 (ideally adjacent each end thereof) to sense the temperatures at such locations of the chamber. If the temperature drops below a preselected level, the adjacent valve 473 is actuated to discharge more steam from manifold 472, thereby to increase the temperature back up to the preset level.

Still referring primarily to FIG. 14, as noted above, the cooling chamber 416 is illustrated as constructed as an extension of, and integral with, the steam chamber 414. The cooling chamber includes cooling banks 474 on opposite sides of the chamber. Each of the banks is composed of a lower manifold line 476 and a plurality of distributor lines 478 extending upwardly from the manifold line 476. The distributor lines 478 include vertically spaced apart outlets that engage with nozzles, not shown, to direct cooling fluid at the meat M passing through the cooling chamber. Because of its large heat capacity, ideally the cooling fluid is water that may be chilled to a temperature below standard supply temperature. The cooling banks 474 spray the coolant over the exterior of the meat M to quickly reduce the surface temperature after the meat M has exited the steam chamber 414. By the time the meat M passes between the cooling banks 472, the harmful surface bacteria and other pathogens have been destroyed. A door structure, similar to door structures 414 and 420 could be utilized at the exit end of the cooling chamber, but such doors are not necessarily required. Also, although water is a preferred cooling medium, other fluids, including air or nitrogen, could be used to cool the exterior of the meat M.

Applicants have found that the processor 410 serves to efficiently and effectively destroying bacteria and other pathogens from the exterior of meat, without detrimentally affecting the meat. Moreover, because the processor 410 is stationary, it is relatively simple to construct and can be operated at high efficiency and with low maintenance. It is to be understood that door structures other than doors 418 and 420 may be utilized. Also, other methods may be used to bias the doors in closed position. Moreover, the door segments may be operated to automatically open at the approach of the meat M, for instance, through the use of proximity sensors or other devices. Further, it can be appreciated that the processor 410 can be changed in scale or size to accommodate various types of meat, including beef, pork, sheep, and poultry. In addition, the processor 410 can be adapted to food stuffs other than meat, for instance, certain types of vegetables.

While preferred embodiments of the present invention has been illustrated and described, it will be appreciated that various changes can be made therein without departing from the spirit and scope of the invention.

The embodiments of the invention in which an exclusive property or privilege is claimed are defined as follows:

1. An apparatus for pasteurizing food, comprising a steam chamber defining an entrance opening and an exit opening, the steam chamber further comprising:

(a) an entrance door structure to nominally close the entrance opening of the steam chamber;

(b) an exit door structure to nominally close the exit opening of the steam chamber;

(c) each of the entrance and exit door structures comprising a plurality of adjacently arranged segments; and (d) a mounting structure to mount the segments of the entrance door structure and exit door structure to allow the segments to shift between open and closed positions independently of each other, thereby allowing passage of the food into the steam chamber and then subsequently out of the steam chamber.

2. The apparatus of claim 1, wherein the door structure segments comprise:

(a) a panel portion defining side edges along the length of the panel portion and end edges of the ends of the panel portion;

(b) one of the side edges defining a mounting edge of the segment to cooperate with the mounting structure; and (c) a flange extending transversely from at least one of the end edges of the segment panel relative to the segment panel.

3. The apparatus according to claim 2, wherein an end flange extends transversely from each end of the panel portion of the door segment.

4. The apparatus according to claim 3, wherein the end flange of one door segment is disposed in close face-to-face relationship with the adjacent end flange of the adjacent door segment.

5. The apparatus according to claim 1, wherein the entrance door segments are arranged vertically along the height of the steam chamber entrance opening, and the exit door segments are arranged vertically along the height of the steam chamber exit opening.

6. The apparatus according to claim 5, wherein each door segment has:

a panel portion defining a side edge portion for mounting the door segment to the mounting structure to swing about an upright axis and defining an upper edge portion and a lower edge portion; and a flange extending transversely from at least one of the upper edge portion and lower edge portion of the door segment in a direction substantially transversely to the panel portion.

7. The structure according to claim 6, wherein a flange extends transversely to the panel portion from both the upper edge portion and lower edge portion of each door segment.

8. The structure according to claim 7, wherein a flange of one door section is positioned in close face-to-face relationship with the adjacent flange of the adjacent door section.

9. An apparatus according to claim 1 or 5 further comprising the closures for urging the door structure segments in nominally closed position, while allowing the door structure segments to open as food enters and exits the steam chamber.

10. The apparatus of claim 9, wherein the mounting structure allows the door structure segments to open when pushed against by the food entering and exiting the steam chamber.

11. The apparatus according to claim 1, 2, 6, or 7, further comprising a moisture removal station for rapidly removing water and other moisture from the exterior surface of the food.

12. The apparatus according to claim 1, 2, 6, or 7, further comprising a cooling station for rapidly chilling the surface of the food heated by the steam.

13. The apparatus according to claim 1, 2, 6, or 7, wherein:
the steam chamber having a vertical height defining a floor portion and a ceiling portion; and
a steam supply delivering steam to the chamber near the floor portion.

14. The apparatus according to claim 13, further comprising a manifold extending along the steam chamber near the floor portion of chamber to introduce steam into the steam chamber.

15. The apparatus according to claim 1, wherein the mounting structure enables all of the segments of a door structure to be opened or closed in unison relative to the steam chamber.

16. An apparatus for pasteurizing meat, comprising:
(a) a steam chamber defining an entrance opening and an exit opening, the steam chamber further comprising:
an entrance door structure to nominally close the entrance opening of the steam chamber;
an exit door structure to nominally close the exit opening of the steam chamber;
each of the entrance and exit door structures comprising a plurality of closely adjacent, vertically arranged door segments;
a mounting structure to mount the segments of the entrance door structure and exit door structure to allow the door segments to move independently of each other between open and closed positions; and
closures for urging the door structure segments in nominally closed position; and
(b) a cooling station near an exit opening of the steam chamber for rapidly chilling the surface of the meat heated by the steam within the steam chamber.

17. The apparatus of claim 16, wherein the door structure segments comprise:
(a) a panel portion defining side edges along the height of the panel portion and end edges along the tops and bottoms of the panel portion;
(b) one of the side edges of the panel portion defining a mounting edge for mounting the panel portion to the mounting structure; and
(c) a flange extending generally transversely from at least one of the top and bottom edges of the segment panel relative to the segment panel.

18. The apparatus according to claim 17, wherein a flange extends transversely from both the upper and lower edges of the lower segment panel portion.

19. The apparatus according to claim 18, wherein at the interface between two adjacent door structure segments, the top edge flange of the lower door segment is in close face-to-face relationship with the bottom edge flange of the upper door segment.

20. The apparatus according to claim 16, further comprising a moisture removal station for rapidly moving water and other moisture from the exterior surface of the meat.

21. The apparatus according to claim 16, wherein:
the steam chamber having a ceiling portion and a floor portion; and
a steam supply supplying steam to the steam chamber near the floor portion thereof.

22. The apparatus according to claim 15, wherein the mounting structure permits all of the segments of a door structure to move in unison between opened and closed positions relative to the steam chamber.

* * * * *

UNITED STATES PATENT AND TRADEMARK OFFICE
CERTIFICATE OF CORRECTION

PATENT NO. : 6,019,033
DATED : February 1, 2000
INVENTOR(S) : R.C. Wilson et al.

It is certified that error appears in the above-identified patent and that said Letters Patent is hereby corrected as shown below:

Column 1,
Item [60] Related Applications, "Jan. 28" should read -- Jan. 23 --

Column 2,
Item [56] Refs. Cited (U.S. PATENTS) insert the following references in the appropriate numerical order:

| | | |
|---|---|---|
| -- 603,082 | 04/1898 | Henkel et al. |
| 1,146,589 | 07/1915 | Morrison |
| 1,848,596 | 03/1932 | Allbright |
| 1,850,031 | 03/1932 | Rayson |
| 2,060,423 | 11/1936 | McKee et al. |
| 2,631,520 | 03/1953 | Geerling |
| 2,978,738 | 04/1961 | Jonsson |
| 3,135,016 | 06/1964 | Ekstam et al. |
| 3,522,058 | 07/1970 | Libby |
| 3/631,563 | 01/1972 | Snowden |
| 3,694,856 | 10/1972 | Kaufman et al. |
| 3,705,813 | 12/1972 | Vogel et al. |
| 3,934,044 | 01/1976 | Busch et al. |
| 3,996,386 | 12/1976 | Malkki et al. |
| 4,234,537 | 11/1980 | Hersom et al. |
| 4,254,152 | 03/1981 | Janovtchik |
| 4,473,004 | 09/1984 | Wells et al. |
| 4,556,572 | 12/1985 | Kaufman, Jr. et al. |
| 4,636,395 | 01/1987 | Robinson, Jr. et al. |
| 4,731,908 | 03/1988 | Thorsen |
| 4,760,780 | 08/1988 | Silvestrini et al. |
| 4,902,522 | 02/1990 | Rudibaugh |
| 4,933,200 | 06/1990 | Shimizu |
| 4,966,072 | 10/1990 | Ellis-Brown |
| 5,045,021 | 09/1991 | Borup |
| 5,043,175 | 08/1991 | Bayley et al. |
| 5,072,663 | 12/1991 | Ellis-Brown |
| 5,093,140 | 03/1992 | Watanabe |
| 5,184,538 | 02/1993 | Ledet |
| 5,281,428 | 01/1994 | Morgan |

UNITED STATES PATENT AND TRADEMARK OFFICE
CERTIFICATE OF CORRECTION

PATENT NO.   : 6,019,033
DATED        : February 1, 2000
INVENTOR(S)  : R.C. Wilson et al.

It is certified that error appears in the above-identified patent and that said Letters Patent is hereby corrected as shown below:

|   |   |   |
|---|---|---|
| 5,439,694 | 08/1995 | Morris, Jr. |
| 5,503,594 | 04/1996 | Karubian et al. |
| 5,514,403 | 05/1996 | Webb et al. |
| 5,560,952 | 10/1996 | Miller et al. |
| 5,607,349 | 03/1997 | Karubian et al. |
| 5,632,670 | 05/1997 | Gwyther -- |

Refs. Cited (FOREIGN PATENTS) insert the following references:

|   |   |   |   |
|---|---|---|---|
| -- | 23,666 | 01/1916 | U.K. |
|    | 338,768 | 12/1929 | U.K. |
|    | 954,391 | 04/1964 | U.K. |
|    | 1,072,430 | 06/1967 | U.K. |
|    | 1,199,557 | 07/1970 | U.K. |
|    | 1,562,590 | 03/1980 | U.K. |
|    | 2,182,461 | 05/1987 | U.K. |
|    | 2,240,912 | 08/1991 | U.K. |
|    | 1,486,467 | 06/1967 | France |
|    | 2,497,072 | 07/1982 | France -- |

Refs. Cited (OTHER REFS.) insert the following references:
-- United States Department of Agriculture, Letter dated 12/05/95
Newspaper article on beef pasteurization, publication unknown, date unknown --

Column 1,
Line 10, after "abandoned" insert -- , --
Line 16, before "more" insert -- , --

Column 2,
Line 65, after "against" insert -- . --

Column 3,
Line 7, after "(e.g." insert -- , --

Column 5,
Line 19, "door, and" should read -- door; --

Column 6,
Lines 39 and 47, "stream" should read -- steam --

UNITED STATES PATENT AND TRADEMARK OFFICE
CERTIFICATE OF CORRECTION

PATENT NO. : 6,019,033
DATED : February 1, 2000
INVENTOR(S) : R.C. Wilson et al.

It is certified that error appears in the above-identified patent and that said Letters Patent is hereby corrected as shown below:

Column 8,
Line 44, "stream" should read -- steam --

Column 10,
Line 20, after "Meat M" delete ","

Column 12,
Line 25, "a conveyor brackets" should read -- conveyor brackets --

Column 13,
Line 5, after "embodiment" insert -- , --
Line 17, "show in" should read -- shown in --
Line 44, after "other number" insert -- of --
Line 59, "is then be" should read -- is then --

Column 19,
Line 66, "destroying" should read -- destroy --

Column 21,
Line 9, after "1 or 5" insert -- , --
Line 33, before "chamber" insert -- the --

Signed and Sealed this

Thirteenth Day of November, 2001

*Attest:*

*Nicholas P. Godici*

*Attesting Officer*

NICHOLAS P. GODICI
*Acting Director of the United States Patent and Trademark Office*